US011034568B2

(12) United States Patent
Gabrieli

(10) Patent No.: US 11,034,568 B2
(45) Date of Patent: Jun. 15, 2021

(54) SYSTEMS, METHODS, AND APPARATUS FOR DISPENSING AMBIENT, COLD, AND CARBONATED WATER

(71) Applicant: AQUEDUCT HOLDINGS LIMITED, St Helier (JE)

(72) Inventor: Davide Gabrieli, Castiglione Olona (IT)

(73) Assignee: AQUEDUCT HOLDINGS LIMITED, St. Helier (JE)

( * ) Notice: Subject to any disclaimer, the term of this patent is extended or adjusted under 35 U.S.C. 154(b) by 984 days.

(21) Appl. No.: 15/407,678

(22) Filed: Jan. 17, 2017

(65) Prior Publication Data

US 2017/0121165 A1 May 4, 2017

Related U.S. Application Data

(63) Continuation-in-part of application No. PCT/US2015/040666, filed on Jul. 15, 2015.

(60) Provisional application No. 62/024,965, filed on Jul. 15, 2014.

(51) Int. Cl.
*B67D 1/00* (2006.01)
*B67D 1/08* (2006.01)
*G06K 7/14* (2006.01)
*G06Q 20/10* (2012.01)

(52) U.S. Cl.
CPC ......... *B67D 1/0041* (2013.01); *B67D 1/0014* (2013.01); *B67D 1/0021* (2013.01); *B67D 1/0061* (2013.01); *B67D 1/0857* (2013.01); *B67D 1/0884* (2013.01); *B67D 1/0888* (2013.01); *G06K 7/1417* (2013.01); *G06Q 20/102* (2013.01); *B67D 2210/0001* (2013.01); *B67D 2210/00015* (2013.01); *B67D 2210/00083* (2013.01); *B67D 2210/00091* (2013.01); *B67D 2210/00104* (2013.01)

(58) Field of Classification Search
CPC .. B67D 1/0041; B67D 1/0857; B67D 1/0888; B67D 1/0884; B67D 1/0021; B67D 1/0014; B67D 1/0061; B67D 2210/00091; B67D 2210/00083; B67D 2210/00015; B67D 2210/0001; B67D 2210/00104; G06Q 20/102; G06K 7/1417
USPC ........................................................ 99/323.2
See application file for complete search history.

(56) References Cited

U.S. PATENT DOCUMENTS 3,312,083 A * 4/1967 Scoggins ................ F25D 11/00
62/390
3,780,198 A * 12/1973 Pahl et al. ................ A23L 2/54
426/477
4,437,499 A * 3/1984 Devale .................. B67D 1/1236
141/198

(Continued)

OTHER PUBLICATIONS

International Search Report for PCT/US2015/040666 dated Oct. 7, 2015; 3 pps.

(Continued)

*Primary Examiner* — Eric S Stapleton
(74) *Attorney, Agent, or Firm* — Michael Downs; Downs IP Law LLC

(57) ABSTRACT

Systems, apparatus, methods, and articles of manufacture provide for a beverage dispensing system configured to form one of a plurality of available types of carbonated and non-carbonated beverage types in response to a user selection.

42 Claims, 9 Drawing Sheets

(56) References Cited

U.S. PATENT DOCUMENTS

| | | | | |
|---|---|---|---|---|
| 5,427,682 A * | 6/1995 | Vogel | B01D 61/08 | 210/257.2 |
| 5,443,739 A * | 8/1995 | Vogel | G07F 13/065 | 210/652 |
| 5,507,329 A * | 4/1996 | Shub | B67D 1/0014 | 141/165 |
| 5,913,454 A * | 6/1999 | McHale | B67D 1/0041 | 222/113 |
| 6,220,047 B1 * | 4/2001 | Vogel | A23G 9/045 | 62/342 |
| 6,354,341 B1 * | 3/2002 | Saveliev | B67D 1/0006 | 141/104 |
| 6,354,342 B1 * | 3/2002 | Gagliano | B67D 1/0006 | 141/82 |
| 6,360,556 B1 * | 3/2002 | Gagliano | B67D 1/0006 | 222/146.6 |
| 6,443,335 B1 * | 9/2002 | Pinedjian | B67D 1/0006 | 222/504 |
| 6,449,970 B1 * | 9/2002 | Gagliano | B67D 1/0006 | 62/196.4 |
| 6,527,146 B1 * | 3/2003 | Tanny | A61L 2/022 | 222/189.11 |
| 6,766,656 B1 * | 7/2004 | Crisp, III | B67D 1/0057 | 222/129 |
| 6,799,085 B1 * | 9/2004 | Crisp, III | B67D 1/0057 | 222/146.6 |
| 6,830,239 B1 * | 12/2004 | Weber | A23G 9/045 | 261/121.1 |
| 6,858,181 B2 * | 2/2005 | Aoyagi | A61L 2/18 | 134/1 |
| 6,945,157 B2 * | 9/2005 | Brown | A23G 9/04 | 222/129.1 |
| 7,164,117 B2 * | 1/2007 | Breed | B60R 21/01516 | 250/208.1 |
| 7,754,025 B1 * | 7/2010 | Crisp, III | B67D 1/0057 | 134/56 D |
| 8,114,662 B2 * | 2/2012 | Clark | B82Y 15/00 | 435/288.7 |
| 9,526,371 B2 * | 12/2016 | Lo Foro | B65D 79/00 | |
| 9,643,828 B2 * | 5/2017 | Brown | F25C 5/20 | |
| 2001/0035016 A1 * | 11/2001 | Weber | A23G 9/045 | 62/210 |
| 2003/0080644 A1 * | 5/2003 | Nelson | H02K 7/14 | 310/196 |
| 2003/0097314 A1 * | 5/2003 | Crisp, III | B67D 1/0021 | 705/28 |
| 2003/0136426 A1 * | 7/2003 | Aoyagi | A61L 2/18 | 134/22.1 |
| 2004/0118872 A1 * | 6/2004 | Romanyszyn | B67D 1/0021 | 222/129.1 |
| 2004/0129723 A1 * | 7/2004 | Meder | B01D 3/02 | 222/113 |
| 2004/0232173 A1 * | 11/2004 | Saveliev | B67D 1/1213 | 222/547 |
| 2005/0046584 A1 * | 3/2005 | Breed | B60N 2/0232 | 340/13.31 |
| 2006/0113322 A1 * | 6/2006 | Maser | B67D 1/07 | 222/129.1 |
| 2006/0208169 A1 * | 9/2006 | Breed | G06K 9/00624 | 250/221 |
| 2007/0086624 A1 * | 4/2007 | Breed | G06K 9/00832 | 382/104 |
| 2007/0137726 A1 * | 6/2007 | Yan | B67D 1/0891 | 141/85 |
| 2007/0151992 A1 * | 7/2007 | Carlson | B67D 1/1213 | 222/509 |
| 2007/0163943 A1 * | 7/2007 | Collins | B01D 63/021 | 210/335 |
| 2007/0175334 A1 * | 8/2007 | Halliday | A47J 31/4492 | 99/279 |
| 2007/0205221 A1 * | 9/2007 | Carpenter | B67D 1/0051 | 222/129.4 |
| 2007/0262574 A1 * | 11/2007 | Breed | B60R 21/0152 | 280/735 |
| 2008/0004973 A1 * | 1/2008 | Rothschild | G06Q 30/0613 | 705/14.46 |
| 2008/0022694 A1 * | 1/2008 | Anderson | B01D 5/009 | 62/3.4 |
| 2008/0036580 A1 * | 2/2008 | Breed | G01S 15/04 | 340/438 |
| 2008/0148948 A1 * | 6/2008 | Evers | B65B 69/005 | 99/275 |
| 2008/0236275 A1 * | 10/2008 | Breed | B60N 2/2806 | 73/290 V |
| 2009/0241782 A1 * | 10/2009 | Van Dillen | A47J 31/407 | 99/279 |
| 2009/0242074 A1 * | 10/2009 | Carrig | G07F 13/00 | 141/26 |
| 2009/0272275 A1 * | 11/2009 | De Graaff | B67D 1/0021 | 99/279 |
| 2009/0293530 A1 * | 12/2009 | Van Dillen | F25D 23/12 | 62/389 |
| 2009/0293735 A1 * | 12/2009 | Van Dillen | A47J 31/0668 | 99/295 |
| 2010/0084426 A1 * | 4/2010 | Devers | B67D 1/06 | 222/2 |
| 2010/0101929 A1 * | 4/2010 | Kamen | B67D 1/0862 | 202/185.3 |
| 2010/0125362 A1 * | 5/2010 | Canora | G07F 9/00 | 700/236 |
| 2010/0139493 A1 * | 6/2010 | Nevarez | A47J 31/002 | 99/275 |
| 2010/0154649 A1 * | 6/2010 | Skalski | A47J 31/4403 | 99/295 |
| 2010/0176147 A1 * | 7/2010 | Segers | B67D 1/0834 | 222/1 |
| 2010/0200110 A1 * | 8/2010 | Segiet | G07F 13/065 | 141/94 |
| 2010/0307185 A1 * | 12/2010 | Crisp, III | B67D 1/0034 | 62/390 |
| 2011/0017776 A1 * | 1/2011 | Metropulos | B67D 1/0888 | 222/129.1 |
| 2011/0042414 A1 * | 2/2011 | Tachibana | B67D 1/0864 | 222/129.1 |
| 2011/0053283 A1 * | 3/2011 | Hood | A61B 5/00 | 436/104 |
| 2011/0061420 A1 * | 3/2011 | Anderson | F25D 31/002 | 62/389 |
| 2011/0147194 A1 * | 6/2011 | Kamen | B01D 1/02 | 202/185.1 |
| 2011/0168738 A1 * | 7/2011 | Nevarez | G07F 17/0071 | 222/129.1 |
| 2011/0316175 A1 * | 12/2011 | Kumar | B01F 3/04808 | 261/22 |
| 2012/0035761 A1 * | 2/2012 | Tilton | G06Q 30/0641 | 700/233 |
| 2012/0156337 A1 * | 6/2012 | Studor | A23F 5/26 | 426/231 |
| 2012/0177784 A1 * | 7/2012 | Malagi | A23L 2/54 | 426/67 |
| 2012/0231126 A1 * | 9/2012 | Lo Faro | A23F 3/18 | 426/115 |
| 2012/0285986 A1 * | 11/2012 | Irvin | A47J 31/007 | 222/1 |
| 2013/0062366 A1 * | 3/2013 | Tansey | B67D 1/0021 | 222/102 |
| 2013/0087050 A1 * | 4/2013 | Studor | A47J 31/52 | 99/285 |
| 2013/0108760 A1 * | 5/2013 | Kumar | B01F 3/04815 | 426/477 |
| 2013/0129870 A1 * | 5/2013 | Novak | B01F 3/04248 | 426/115 |
| 2013/0292407 A1 * | 11/2013 | Beavis | F04B 17/044 | 222/1 |
| 2013/0327228 A1 * | 12/2013 | Holman | G07F 17/0064 | 99/485 |
| 2013/0327231 A1 * | 12/2013 | Holman | A23P 10/00 | 99/486 |

(56) References Cited

U.S. PATENT DOCUMENTS

| | | | | |
|---|---|---|---|---|
| 2013/0330442 A1* | 12/2013 | Holman | G07F 9/006 | 426/87 |
| 2013/0330448 A1* | 12/2013 | Holman | G06Q 50/22 | 426/231 |
| 2013/0330449 A1* | 12/2013 | Holman | A23P 10/00 | 426/231 |
| 2013/0330450 A1* | 12/2013 | Holman | A23P 10/00 | 426/231 |
| 2013/0330452 A1* | 12/2013 | Holman | A23P 10/00 | 426/231 |
| 2013/0330456 A1* | 12/2013 | Holman | A47J 31/44 | 426/531 |
| 2013/0331965 A1* | 12/2013 | Holman | A23L 5/00 | 700/90 |
| 2013/0331966 A1* | 12/2013 | Holman | G06Q 10/08 | 700/90 |
| 2013/0331981 A1* | 12/2013 | Holman | A47J 27/14 | 700/233 |
| 2013/0331982 A1* | 12/2013 | Holman | G07F 9/002 | 700/233 |
| 2014/0107835 A1* | 4/2014 | Biasi | B67D 1/0892 | 700/231 |
| 2014/0209634 A1* | 7/2014 | Metropulos | B67D 1/06 | 222/129.1 |
| 2014/0239521 A1* | 8/2014 | Ergican | B67D 1/0058 | 261/115 |
| 2014/0263406 A1* | 9/2014 | Green | B67D 1/0065 | 222/1 |
| 2014/0263413 A1* | 9/2014 | Green | B67D 1/0065 | 222/1 |
| 2014/0299630 A1* | 10/2014 | Brown | B67D 3/0054 | 222/129.1 |
| 2014/0363548 A1* | 12/2014 | Njaastad | A23L 2/54 | 426/231 |
| 2014/0372233 A1* | 12/2014 | Knecht | G06Q 30/0635 | 705/15 |
| 2015/0315008 A1* | 11/2015 | Locke | B67D 1/0888 | 222/52 |
| 2016/0003523 A1* | 1/2016 | Kim | B01F 15/00155 | 222/146.6 |

OTHER PUBLICATIONS

Written Opinion for PCT/US2015/040666 dated Oct. 7, 2015; 15 pps.

International Preliminary Report on Patentability for PCT/US2015/040666 dated Jan. 26, 2017; 12 pps.

* cited by examiner

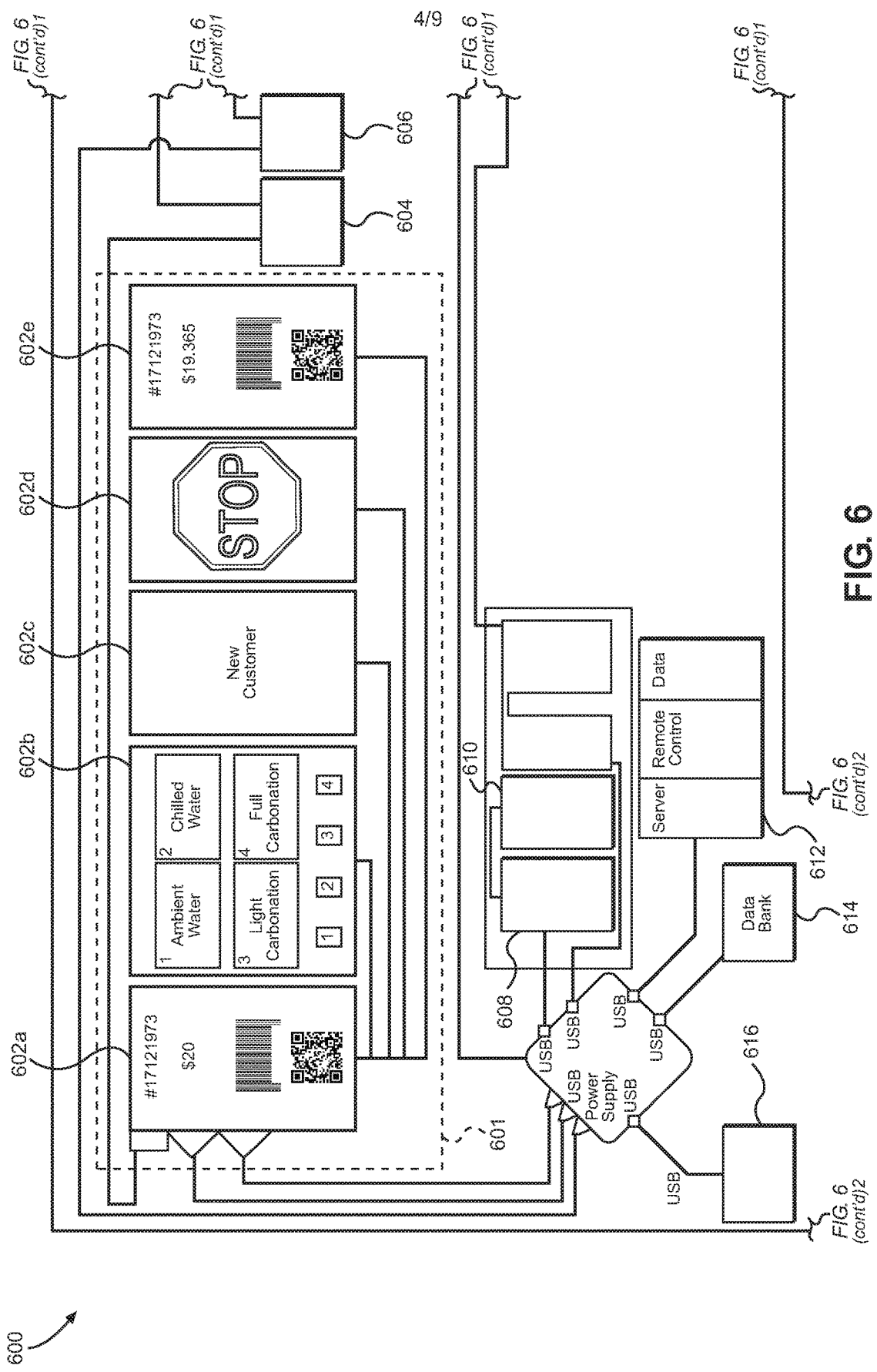

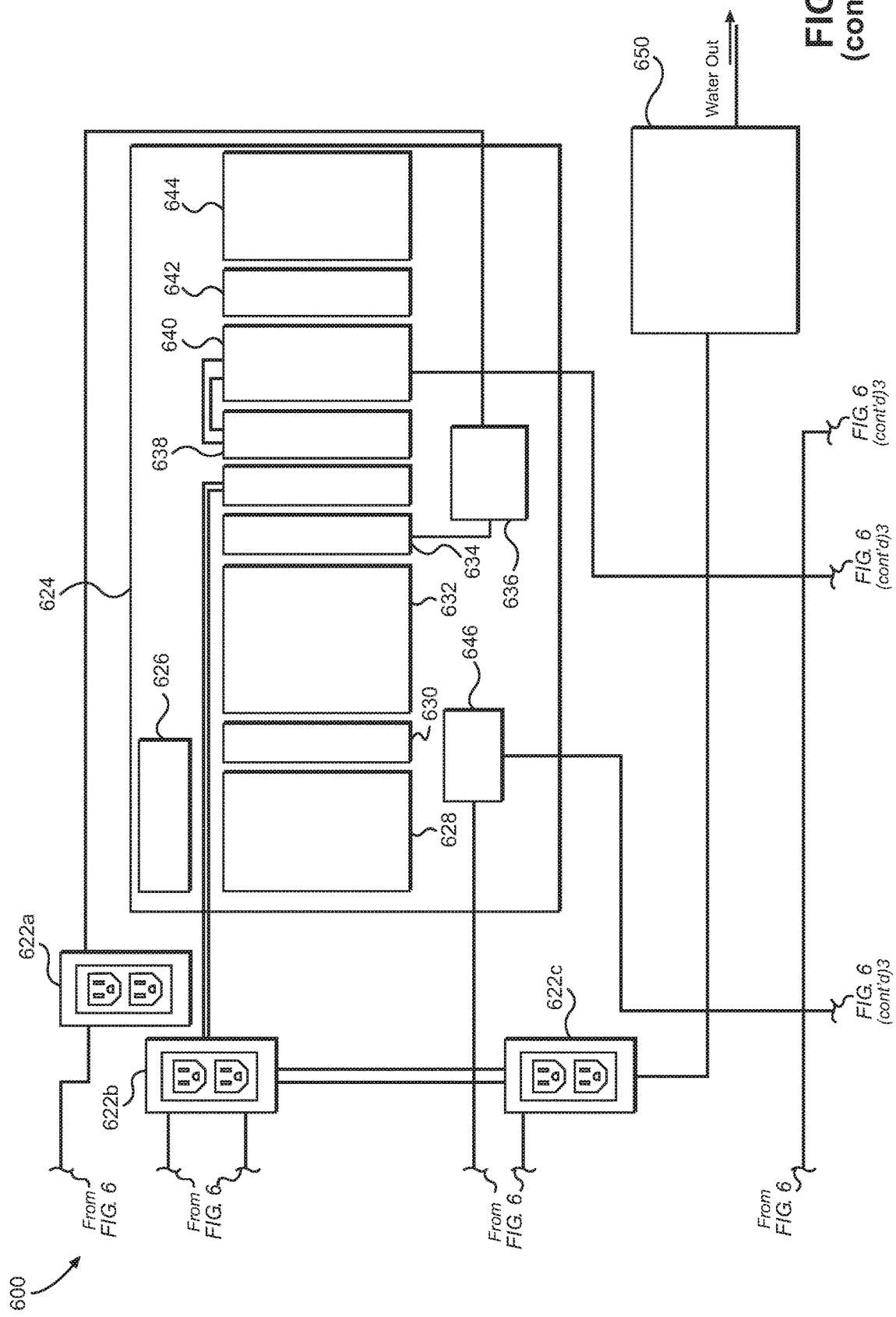
FIG. 6 (cont'd)1

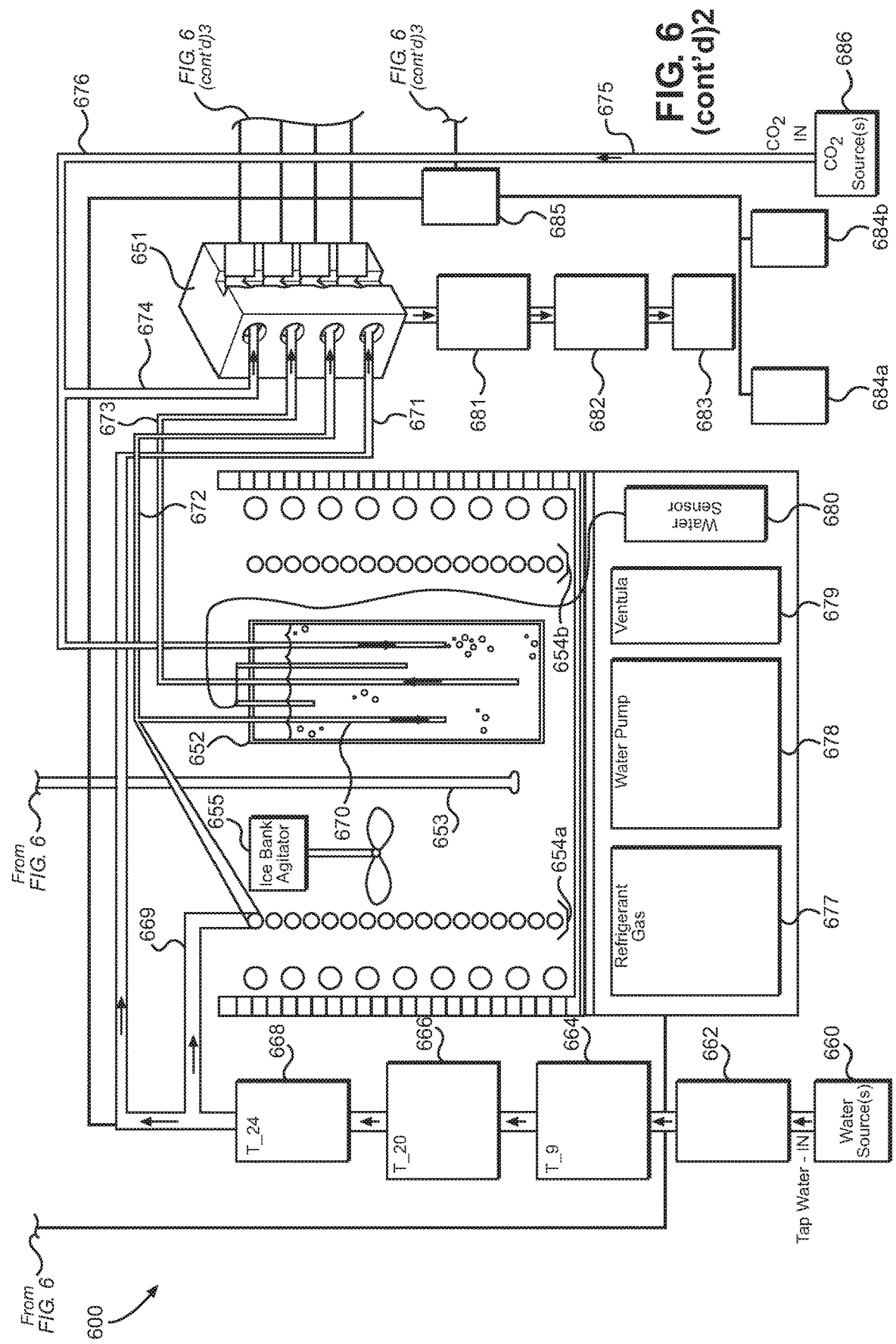

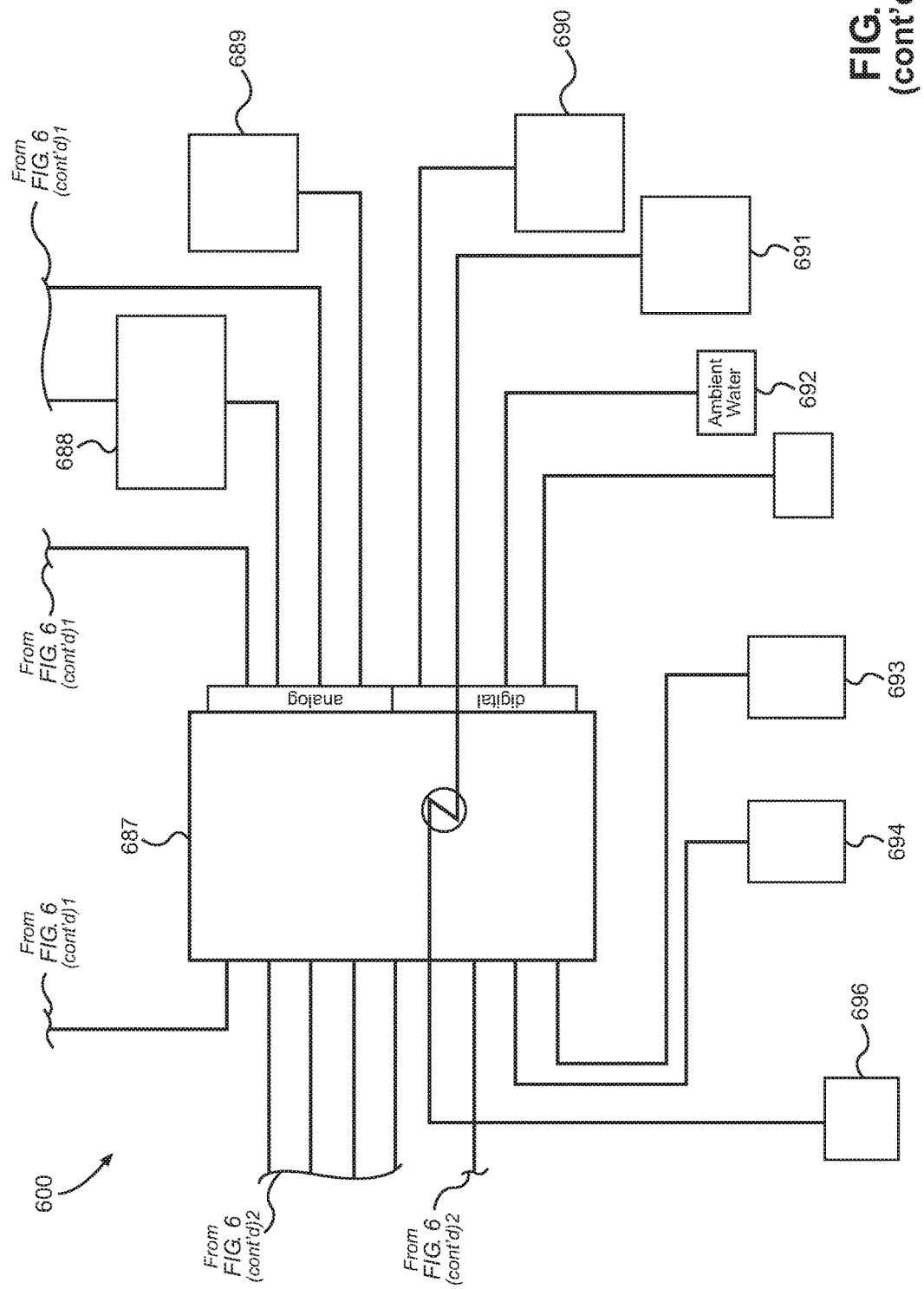

SYSTEMS, METHODS, AND APPARATUS FOR DISPENSING AMBIENT, COLD, AND CARBONATED WATER

FIELD OF THE INVENTION

The described embodiments relate to systems, methods, and apparatus for dispensing beverages and to systems, methods, and apparatus for carbonating beverages, including water.

BACKGROUND

Non-carbonated beverages, such as, for example, still water; and carbonated beverages, such as, for example, sodas and sparkling water, are popular with consumers. Many types of pre-packaged carbonated beverages are available (e.g., for retail purchase at a store). Some types of beverage carbonation and beverage dispensing systems are also available. Despite the popularity of various types of non-carbonated and carbonated beverages previous systems have failed to provide for user-selectable carbonation levels and/or beverage temperature options, and/or have failed to provide a system offering a variety of beverage preparation, temperature, and/or carbonation options.

BRIEF DESCRIPTION OF THE DRAWINGS

An understanding of embodiments described in this disclosure and many of the related advantages may be readily obtained by reference to the following detailed description when considered with the accompanying drawings, of which:

FIG. 6 is a diagram of a beverage dispensing system according to an embodiment of the present invention;

DETAILED DESCRIPTION

A. Introduction

Figure 1:
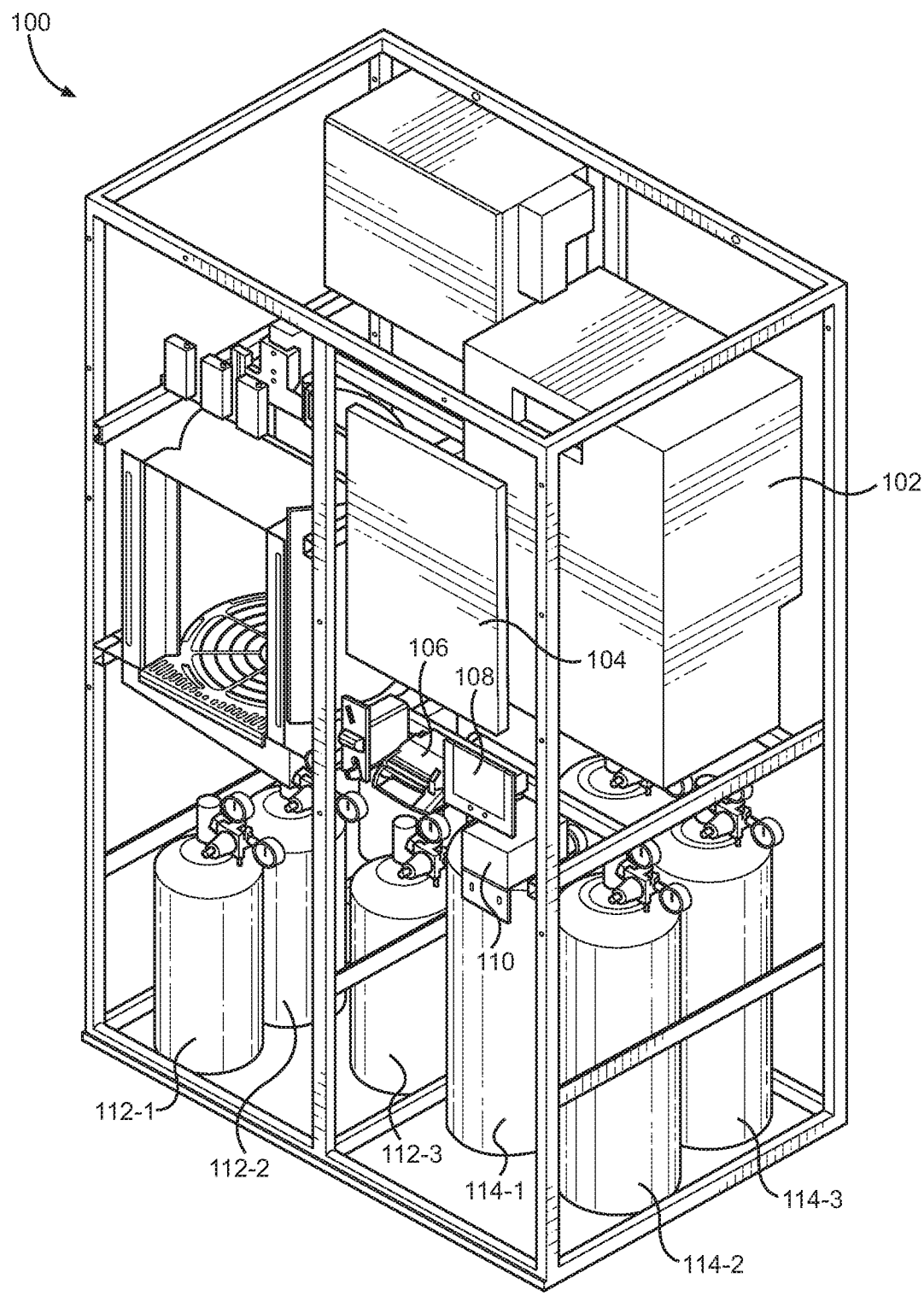
FIG. 1 is a diagram of a system according to an embodiment of the present invention.

One or more embodiments described in this disclosure are descriptive of systems, apparatus, interfaces, methods, and articles of manufacture for beverage dispensing machines, including machines configured for dispensing, water, carbonated beverages, and/or other types of beverages. According to some embodiments, beverage dispensing machines may be embodied as, integrated with, and/or comprise one or more vending machines. In accordance with some embodiments, a water vending machine is configured for dispensing one or more varieties of water, including still water and/or one or more varieties of carbonated water (e.g., a less carbonated water and a more carbonated water).

One or more embodiments described in this disclosure are descriptive of systems, apparatus, interfaces, methods, and articles of manufacture for beverage dispensing machines, including a "beverage component mixing module," "mixing module," or "beverage dispensing device" (also referred to as a "darlin" component or device or an "R_3" component in this disclosure with respect to some embodiments, and in U.S. Provisional Patent Application No. 62/024,965, which is incorporated by reference in this application) and/or a controller device configured (e.g., with appropriate computer-readable software instructions) to control the operation of the beverage component mixing module. In some embodiments, "beverage dispensing device" may comprise, in addition to one or more components for selectively utilizing one or more of a plurality of available beverage components (e.g., still water, chilled water, carbonated water, chilled carbonated water, etc.), one or more components for outputting or otherwise dispensing a beverage from a machine (e.g., a beverage dispenser that extrudes a beverage from a nozzle, faucet, or other type of liquid dispenser). According to some embodiments, the beverage component mixing module is configured to receive one or more types of water as inputs to the mixing module, and operates (e.g., in response to control by a controller device) to mix or otherwise dispense a desired beverage.

One or more embodiments described in this disclosure are descriptive of systems, apparatus, interfaces, methods, and articles of manufacture for beverage dispensing machines, including at least one controller device (e.g., a remote computer server and/or a server internal to a beverage dispensing machine) for controlling a plurality of components of a beverage dispensing machine, such components including, but being not limited to:

- a beverage cooling system,
- a beverage carbonation system,
- a beverage mixing module and/or beverage dispensing device,
- a relay controller device or module for controlling one, a few, many, and/or all of the components of a beverage dispensing device for mixing and/or dispensing a beverage,
- any of various types of connected sensors (e.g., thermometers, flow meters, leak detectors, carbon dioxide detectors, filter status sensors, ultraviolet (UV) light emission sensors, etc.),
- a liquid (e.g., water) filtration system,
- a payment processing system (e.g., a bill and/or coin acceptor, a credit card processing system),
- a user interface,
- a bar code reader, and/or
- a printer (e.g., for printing receipts).

In one or more embodiments, the mixing module is configured to receive one or more of the following types of water: ambient (natural or "still") water, cold (still) water, and/or carbonated or "sparkling" water. In one or more embodiments, the mixing module may be configured to receive a carbonated water (e.g., "full sparkling water") and combine the carbonated water with still water (ambient and/or cold) in accordance with a predetermined mix for a desired beverage. In one example, highly carbonated water may be diluted with cold still water by the mixing module in order to output a desired water product (e.g. a frizzante-style beverage comprising both the input highly carbonated water and the input cold still water in a desired mix ratio such as, without limitation, 70:30).

In one or more embodiments, the mixing module comprises a respective solenoid valve for each type of input to the mixing module. In some embodiments, each solenoid valve of the mixing module may be operated (e.g., in accordance with software instructions and/or in response to signals from a controller device) in order to receive a desired (relative) amount of each beverage component required for a desired beverage mix. For example, if a less carbonated final beverage mix is desired, the controller device may electronically control the solenoid valves of the mixing module to receive full sparkling water and chilled still water into the mixing module so that they are combined, in a desired ratio, in the final water beverage output by the mixing module.

According to some embodiments, the mixing module may, alternatively or in addition, be configured to receive carbon dioxide ($CO_2$) into the mixing module (e.g., in accordance with instructions from a controller device) and/or output $CO_2$ (e.g., for cleaning components of the beverage mixing machine).

According to some embodiments, for example, a beverage dispensing machine may comprise a cabinet, housing: (i) a beverage mixing module configured for receiving two or more types of beverage inputs (e.g., still water, sparkling water) and selectively outputting a desired beverage product comprising one or more of the beverage inputs; (ii) respective sources and transmission means for the two or more types of beverage inputs; (iii) an electronic processor in communication with the beverage mixing module, wherein the electronic processor is operable to transmit a signal to the mixing module (e.g., in accordance with software instructions), the signal being indicative of a desired mix of input components in a beverage product to be dispensed and/or being control signals for controlling the operation of one or more solenoid valves of the mixing module; and (iv) a dispensing device (e.g., a beverage fountain) for outputting a beverage product (e.g., mixed and output by the beverage mixing module to the dispensing device) to a user.

Various embodiments of a beverage dispensing machine, beverage dispensing system, and/or beverage mixing module, and corresponding processes, are described with respect to the accompanying figures.

Referring now to FIG. 1, a perspective view of a system 100 according to some embodiments is shown. System 100 (e.g., a beverage dispensing system) may comprise, in some embodiments, a housing or cabinet (not shown). System 100, as depicted in FIG. 1, may comprise an integrated cooling and carbonation machine (also referred to in this disclosure as an "asset machine") 102 for cooling and/or carbonated one or more types of liquids (e.g., water for use making a beverage). The system 100 may further comprise a display device or other type of user interface 104, a payment processing system 106 (e.g., a bill and/or coin acceptor), and/or a scanner or code reader 108 (e.g., a QR code reader for reading a QR code from a printed voucher, certificate, ticket, coupon, card, or the like). According to some embodiments, the system 100 further comprises a printer 110 for printing receipts, cards, and the like (e.g., with a QR code indicating a balance of a user's account).

According to some embodiments, the system 100 may further comprise one or more carbon dioxide sources 114-1, 114-2, 114-3 (e.g., a primary or main carbon dioxide supply source) and/or 112-1, 112-2, 112-3 (e.g., a reserve system), for storing and transmitting carbon dioxide gas in the system 100 (e.g., for carbonating water to make a desired beverage).

Figure 2:
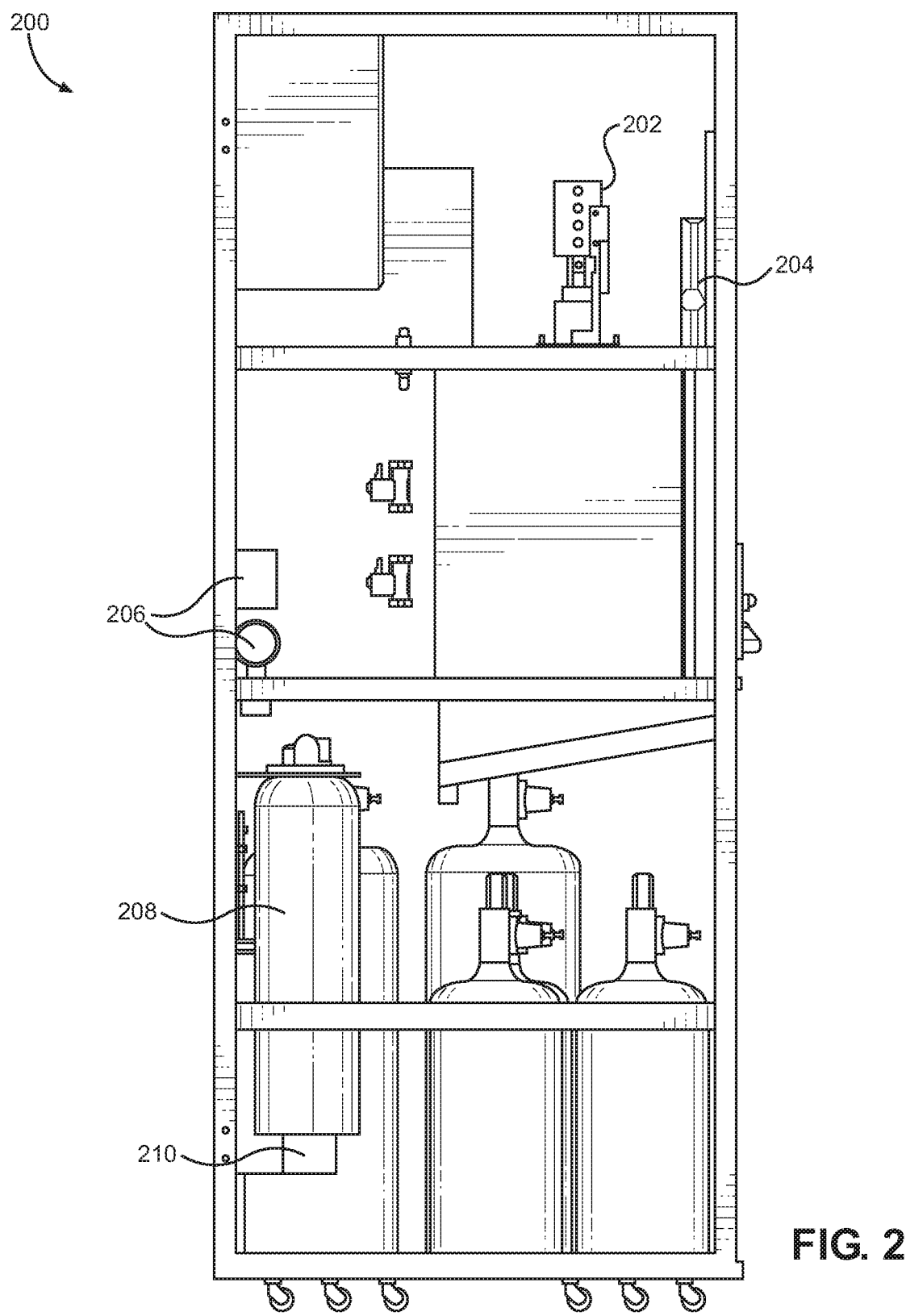
FIG. 2 is a diagram of a system according to an embodiment of the present invention.

Referring now to FIG. 2, a side view of a system 200 according to some embodiments is shown. System 200 (e.g., which be the same or different from the system 100) may comprise, in some embodiments, a housing or cabinet (not shown). System 200, as depicted in FIG. 2, may comprise a beverage mixing module 202, a server computer or other type of controller device 204 (e.g., an N2620G Linuxe computer by Acer Computer™) for controlling one or more functions of the system 200 (e.g., to drive a user selection interface (not shown) to display selectable options to users for carbonated and non-carbonated beverages to have the system 200 make and dispense).

In one or more embodiments, the system 200 may further comprise one or more types of pre-filter 208 (e.g., a pre-filter for first filtering water for use in making a beverage) and/or filter 210 (e.g., for filtering water after a pre-filtration process using filter 208). According to some embodiments, the system 200 may further comprise a UV light system 206 for sterilizing water and providing, in one or more embodiments, a relatively higher quality of filtered water than typically found in a vending machine, for instance.

According to some embodiments, the depicted components of both the example system 100 and the example system 200 may be integrated (e.g., along with a housing and/or one or more other types of components) into a stand-alone beverage dispensing system.

Figure 3:
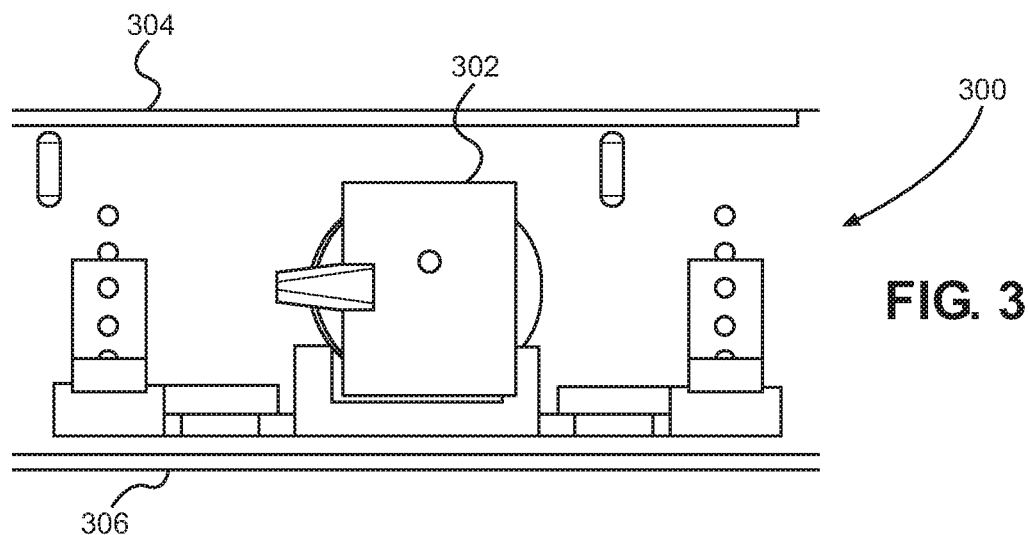
FIG. 3 is a diagram of a system according to an embodiment of the present invention.

Referring now to FIG. 3, a top view of a system 300 according to some embodiments is shown. System 300 (e.g., which be the same or different from the system 200 or 300) may comprise, in some embodiments, a housing or cabinet (not shown), in addition to supporting structured members 304 and/or 306 (e.g., for mounting and/or providing rigidity and stability to a beverage dispensing system). As depicted in FIG. 3, the system 300 may comprise a beverage dispensing device or mixing module 302 mounted in the system 300 and configured (e.g., in accordance with instructions executed by a controller device to prepare a selected beverage) to selectively receive and/or mix at least one of a plurality of fluid inputs or other types of beverage components. Although this disclosure may refer to the beverage dispensing device and beverage mixing module as "mixing" components, it is contemplated that "mixing" or "dispensing" may include selectively allowing only one of a plurality of available beverage components to pass into the device or module for preparing a beverage. For example, dispensing a beverage comprising only still water may be referred to in this disclosure as "mixing" that single-component beverage, although there is no actual mixing of multiple components, because the mixing module is being actively controlled (e.g., by signals from a controller device and/or in accordance with predetermined beverage data) to open and close the plurality of valves correctly in order to provide the right "mix" of available fluid inputs.

Figure 4:
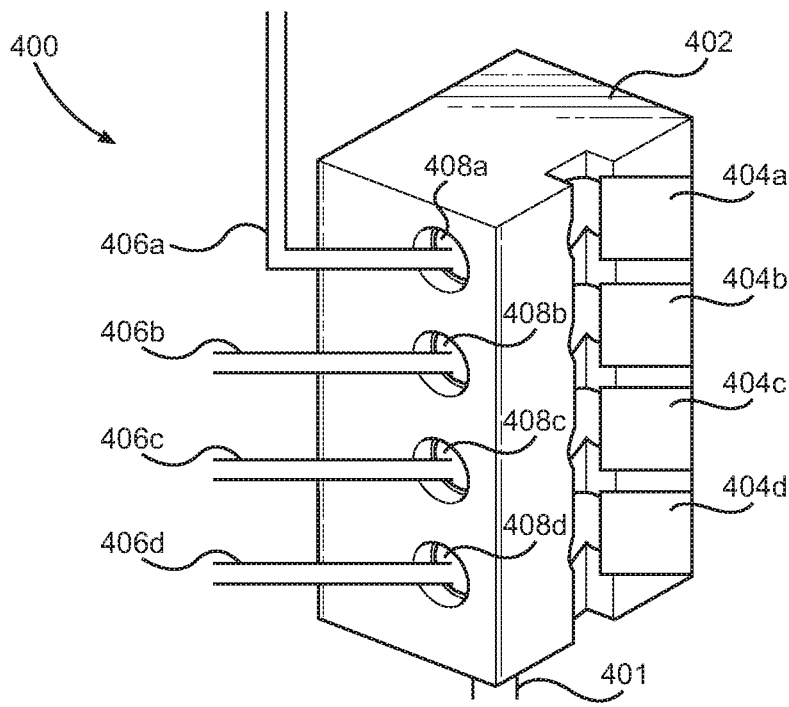
FIG. 4 is a diagram of a beverage dispensing device according to an embodiment of the present invention.

Referring now to FIG. 4, a perspective diagram of a beverage dispensing device 400 is shown. In accordance with some embodiments, the beverage dispensing device 400 comprises the "darlin" or beverage mixing module 402, beverage component inputs 406*a-d* (e.g., for transmitting a plurality of types of fluids and/or carbon dioxide gas to the beverage mixing module 402), and the dispensing output 401 (e.g., comprising an electro-mechanically controllable liquid dispenser, nozzle, faucet, beverage fountain or the like).

As depicted in FIG. 4, the beverage mixing module 402 may comprise respective passageways 408*a-d* for receiving beverage component inputs 406*a-d* (e.g., for input of CO2, full sparkling water, chilled still water, and/or ambient water). In some embodiments, each passageway 408*a-d* and/or beverage component input 406*a-d* is associated with a respective selectively controllable valve 404*a-d*. In one or more embodiments, the beverage mixing module 402 comprises a respective solenoid valve for each type of input to the mixing module. In some embodiments, each solenoid valve of the mixing module 402 may be operated (e.g., in accordance with software instructions and/or in response to signals from a controller device) in order to receive a desired (relative) amount of each beverage component required for a desired beverage mix. For example, if a less carbonated final beverage mix is desired, the controller device may electronically control the solenoid valves of the mixing module to receive full sparkling water (e.g., via beverage component input 406*a*) and chilled still water (e.g., via beverage component input 406*b*) into the mixing module 402 so that they are combined, in a desired ratio in accordance with a predetermined recipe for making a particular beverage, in the final beverage product output by the beverage dispensing device 400 (e.g., via dispensing output 401).

In one embodiment, the beverage mixing module 402 may comprise a passageway for receiving cooling water and/or one or more service access points for cleaning. In some embodiments, connecting a source of CO2 and/or water to the service access point allows for one or more internal components of the beverage dispensing machine to be flushed or otherwise cleaned of any particulates, residue, or debris.

Figure 5:
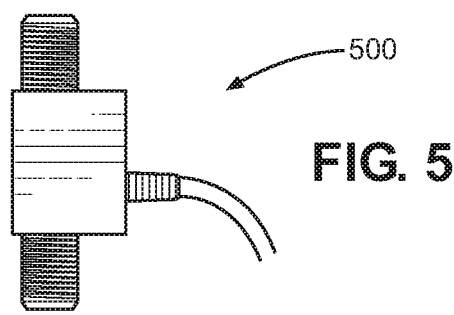
FIG. 5 is a diagram of a flow meter according to an embodiment of the present invention.

Referring now to FIG. 5, a side view of a flow meter 500 is shown. Various embodiments of the present invention may utilize one or more flow meters 500 in a beverage dispensing system (e.g., beverage dispensing system 600 of FIG. 6). A flow meter 500 may be utilized, for example, at one or more beverage component inputs 406*a-d* and/or dispensing output 401 of the beverage dispensing device 400, in order to determine (e.g., by a server computer, relay controller module and/or other type of controller device) a rate of flow of beverage components and/or finished beverage products, respectively. In some embodiments, a flow rate of one or more inputs and/or outputs may be adjusted (e.g., by a controller device), such as by adjusting one or more of valves 404*a-d*, for example, to allow more or less of the respective fluid to pass.

According to some embodiments, information from the flow meter 500 may be used in addition to a mathematical formula to determine the pricing of a dispensed beverage, in order to produce a greater accuracy at dispensing. In one embodiment, the equation is imbedded in software and uses the parameters time (T), volume (V), dollars ($), and a specified quantity of water desired (X). The software manages and receives data on volume, V, from the flow meter 500 and combines it with the data on the time elapsed between user selection of water type, X, and user termination of disbursement of the water, T. According to some embodiments, the ratio of T/V and $/V may be calibrated at the time of lease, for each individual machine, and may be installed for each type of water that is offered to the customer.

Referring now to FIG. 6, an example beverage dispensing system 600 is depicted, in accordance with one or more embodiments described in this disclosure. As shown in FIG. 6, the example beverage dispensing system 600 may comprise a user interface 601, such as a touch screen display device. User interface 601 is depicted with dashed lines to emphasize that the example user interface displays 602*a*-602*e* may, but may not necessarily, be displayed via the user interface 601 simultaneously. The depicted example user interface 601 thus represents some examples of different user interface displays 602*a*-602*e*, which may appear, in accordance with various embodiments, at different points in a beverage dispensing process. Some example functions corresponding respectively to the example user interface displays 602*a*-602*e* are discussed in this disclosure below with respect to an example beverage vending process.

According to some embodiments, the beverage dispensing system 600 may comprise a user interface power supply 604 for supplying electrical power to the user interface 601, and/or a server power supply 606 for supplying electrical power to the server 612. In one or more embodiments, the beverage dispensing system 600 may comprise a payment processing system 608, such as, for example, a bill acceptor, a coin acceptor, and/or a credit card or stored value processing system. Various types of payment processing systems applicable to a vending machines and that may be utilized for accepting payment for vended beverage products are known in the art.

According to some embodiments, the beverage dispensing system 600 may comprise a printer 610 configured to print cards, receipts, vouchers, certificates, and/or tickets or the like. In one embodiment, the printer 610 may be configured to print (e.g., in response to a signal from server 612) a receipt including indicia of an available user account balance, an account number, a bar code, and/or a QR code that identifies a user account and/or an account balance. Some examples of such information are represented in example user interface displays 602*a* and 602*e*. Bar code reader 616, in accordance with some embodiments, may be used to read a bar code and/or a QR code (e.g., from a printed ticket) in order to determine, for example, an account associated with a user and/or an available balance associated with a user's account (e.g., for use in purchasing a beverage product from a beverage dispensing machine).

According to some embodiments, the beverage dispensing system 600 may further comprise a server 612, which may act as a controller device for controlling one or more peripherals and/or beverage dispensing modules or systems of the beverage dispensing system 600, and/or may control at least one other controller device (e.g., relay board 687). In one embodiment, the server 612 may be external to a housing or stand-alone machine that embodies other components of the beverage dispensing system 600. In accordance with some embodiments, the server 612 may retrieve, access, receive, and/or otherwise determine information (e.g., user data, beverage data, transaction data, and/or specialized computer-executable instructions for performing functions of the beverage dispensing system 600) from one or more of a data store or memory device of the server 612 and/or a data bank 614 (e.g., accessible via a local communication network, or remotely via the Internet).

According to one or more embodiments, the beverage dispensing system 600 may further comprise one or more of the following types of components:

a) electrical power sources 622*a-c,*
b) an electrical panel or electrical subsystem 624,
c) an electrical ground bar 626,
d) a neutral bar 628, 644
e) circuit breakers 630, 634, 637, 638
f) energy meter 632,
g) a current sensor 636,
h) a power supply 640,
i) a surge protector 642, and/or
j) a USB isolator 646.

According to one or more embodiments, the beverage dispensing system 600 may comprise a condensate pump 650 for pumping condensation (e.g., collected water) out of the beverage dispensing system 600 and/or out the electrical panel 624).

According to some embodiments and referring to FIG. 6 (cont'd)2, the beverage dispensing system 600 may further comprise a beverage filtration system, a beverage cooling system, and a beverage carbonation system. As described elsewhere in this disclosure, in one embodiment the beverage cooling system and a beverage carbonation system may be integrated as a single unit machine referred to as an asset machine in this disclosure.

As depicted in FIG. 6, the beverage dispensing system 600 may comprise a carbonation chamber or vessel 652 for combining carbon dioxide gas with still water to create carbonated water (e.g., of a desired level of carbonation and/or a desired temperature). Water source(s) 660 provides a water supply (e.g., tap water available from a public water system) into the beverage dispensing system 600. In accordance with one example embodiment, as needed (e.g., in response to a signal to prepare a beverage product), the water is drawn (e.g., by opening a valve) into the system 600 from the water source(s) 660 and through a pre-filter or pre-filter housing 662. The water may then pass through a backflow preventer or no return valve 664, before passing to a filter device 666 (e.g., 3M™ DWS160-L System water filter). In one embodiment, the water also passes through at least one UV-based sterilization system 668 (e.g., the S2Q-PV Silver Series UV sterilization system by Sterilight) before it is prepared for further processing, mixing, and/or dispensing.

According to some embodiments, the filtered and/or sterilized water (which will be referred to as filtered water) may then be directed (e.g., in accordance with signals from at least one controller device) to the cooling system via tubing 669 and then to the beverage dispensing device 651 via tubing 672 (e.g., as chilled, still water); to the cooling system via tubing 669, then to the carbonation chamber 652 via tubing 670, and then to the beverage dispensing device 651 via tubing 673 (e.g., as chilled, carbonated water); and/or directly to the beverage dispensing device 651 via tubing 671 (e.g., as ambient temperature still water. In other words, the beverage dispensing system 600 is configured to direct the filtered (still) water to a cooling process, a cooling process and a carbonation process, and/or to a mixing process directly as a beverage component, based on, for example, the type of beverage product being produced in response to a user's selection.

With respect to the cooling process, the still, filtered water enters at least one of the ice baths 654*a-b*, where it is subjected to the ice bank agitator 655. A temperature probe 653 of temperature sensor 688 may be used to monitor a temperature of water being chilled, and to trigger a controller device to take appropriate action to bring water to a desired temperature (e.g., to a predetermined minimum or maximum temperature value that is stored in and accessible from a memory device). Refrigerant gas 677, water pump 678, and/or ventula 679 may be utilized in the water cooling process in order to bring the water to a desired temperature and/or to draw more water into the cooling system.

According to some embodiments, prior to being dispensed or sent to a carbonation process or mixing process, chilled and filtered water may be stored in one or more reservoirs, tanks, or other water storage containers. In this way, chilled and filtered water may be available as necessary on demand for dispensing and/or mixing prior to dispensing in response to a user selection, without having to first filter and/or chill the water, making the beverage available to the user more quickly. In one example, after filtered water is chilled by one or more of ice baths 654*a-b* or other chilling system, it may be stored in one or more reservoirs (preferably insulated to maintain the chilled temperature). In some embodiments, a controller device may be configured, in response to a user selection (e.g., via an interface), to direct filtered and cooled water stored in one or more reservoirs to a beverage dispensing system (e.g., in response to a user selection of a chilled, non-carbonated water beverage) and/or to a water carbonation system (e.g., in response to a user selection of a carbonated beverage).

If carbonated water is required, an amount of chilled, still water may be directed (e.g., via tubing 670 and/or from a reservoir of chilled and filtered water) to the carbonation chamber 652 for mixing with carbon dioxide gas from carbon dioxide source(s) 686 via tubing 675. Chilled, carbonated water is able to exit the carbonation chamber 652 via tubing 673 (e.g., directed to by a controller device) for input to the beverage dispensing device 651.

As discussed with respect to FIG. 4, the beverage mixing module of beverage dispensing device 651 may comprise a plurality of beverage component inputs, as discussed above, and respective valves may be manipulated (e.g., by a controller device) to acquire the desired mix of one or more beverage components to create a user-selected beverage product. The beverage product, mixed by the beverage mixing module, outputs the beverage product via a dispenser system comprising a flow meter 681, a dispenser 682 (e.g., a beverage fountain nozzle), and/or a dispenser tip 683 (e.g., a metal tip affixed to the dispenser 682). A cup, bottle, or other vessel may be placed by a user (or, in some embodiments, automatically by the beverage dispensing system) under the dispenser tip 683 or otherwise so the dispenser 682 outputs the beverage product into the vessel.

In one embodiment, the beverage dispensing system 600 further comprises a cleaning system for cleaning a dispenser area of the beverage dispensing system 600, the system comprising a water line connected (directly or indirectly) to a water source, and controlled by valve 685 (e.g., under the direction of controller device 687) to spray a cleansing mist on the dispensing area via one or more spray nozzles 684*a-b*.

According to some embodiments and referring to FIG. 6 (cont'd)3, the beverage dispensing system 600 may further comprise a relay board or controller device 687 for controlling one, some, many, or all of the dispensing, mixing, and/or cleaning functions (e.g., cooling, filtration, carbonation, mixing, and/or misting, etc.). In some embodiments, one or more of the functions described with respect to relay board 687 may be executed by the server 612 as deemed appropriate for a desired implementation. Similarly, in some embodiments one or more of the functions described with respect to system 600 as being performed by or under the control of server 612 may be performed by or under the control of controller device 687. The controller device 687, as depicted, is preferably in communication with the valves (not specifically labeled) of beverage dispensing device 651 for controlling the mix of beverage components in creating a finished beverage product. The controller device may also, in some embodiments, be in communication with and/or controlling one or more of:

a) a temperature sensor 688,
    b) a pressure transducer 689,
    c) a flow meter 690,
    d) a water leak sensor 691,
    e) a source of ambient water 692, and/or
    f) at least one solenoid valve 693, 694, 696.

Figure 7:
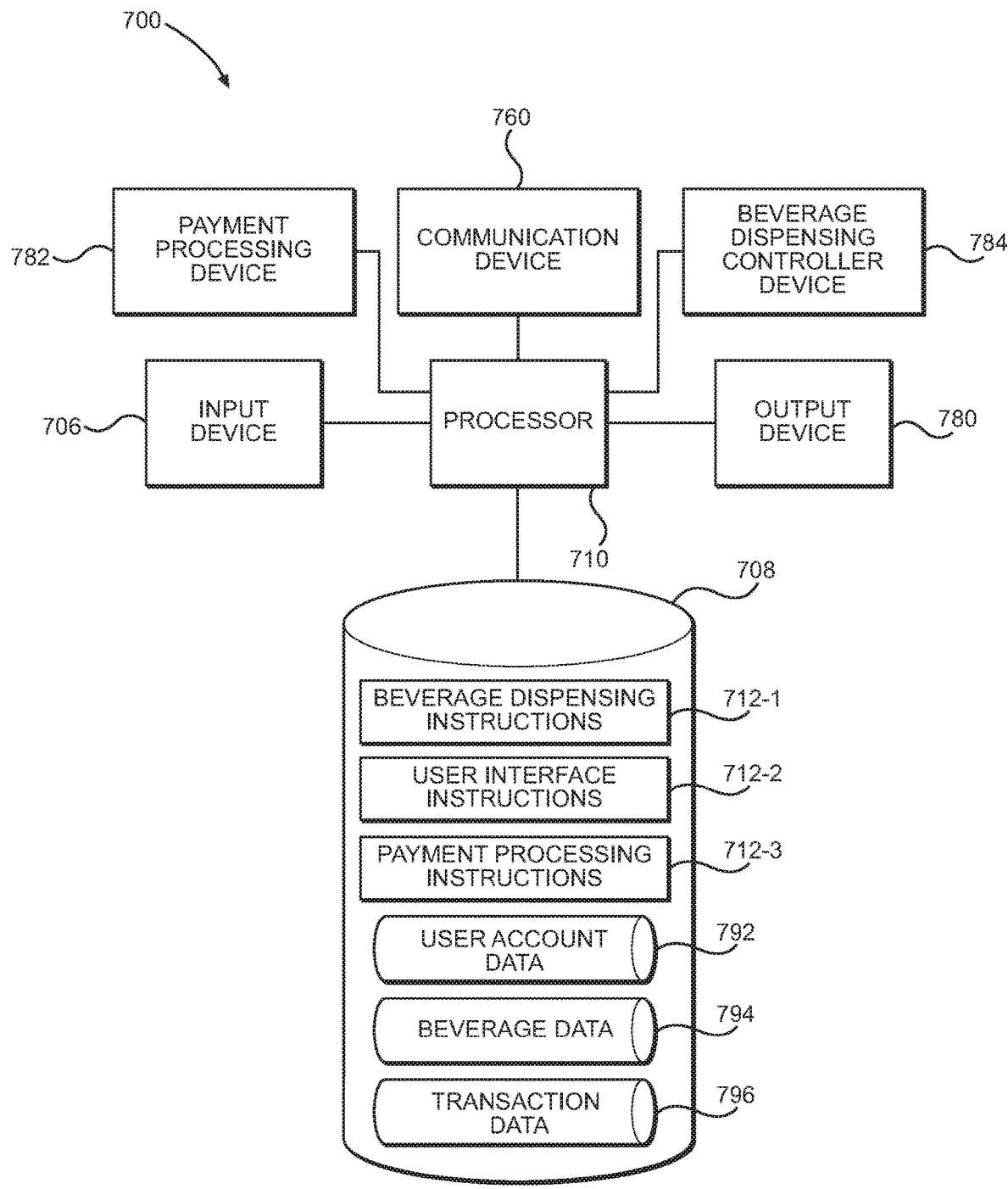
FIG. 7 is a diagram of an apparatus according to an embodiment of the present invention.

Turning to FIG. 7, a block diagram of an apparatus 700 according to some embodiments is shown. In some embodiments, the apparatus 700 may be similar in configuration and/or functionality to any of the systems 100, 200, and/or 600 and/or the servers and/or controller devices 612 and/or 687, and/or may otherwise comprise a portion of the systems 100, 200, 300, and/or 600 of FIG. 1, FIG. 2, FIG. 3, and/or FIG. 6 herein. The apparatus 700 may, for example, execute, process, facilitate, and/or otherwise be associated with any of the various methods described in this disclosure. In some embodiments, the apparatus 700 may comprise a processor 710, an input device 706, an output device 780, a communication device 760, and/or a memory device 708. According to some embodiments, any or all of the components of the apparatus 700 may be similar in configuration and/or functionality to any similarly named and/or numbered components described herein. Fewer or more components and/or various configurations of the components may be included in the apparatus 700 without deviating from the scope of embodiments described herein.

According to some embodiments, the processor 710 may be or include any type, quantity, and/or configuration of electronic and/or computerized processor. The processor 710 may comprise, for example, an Intel® IXP 2800 network processor or an Intel® XEON™ Processor coupled with an Intel® E7501 chipset. In some embodiments, the processor 710 may comprise multiple inter-connected processors, microprocessors, and/or micro-engines. According to some embodiments, the processor 710 (and/or the apparatus 700 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 700 comprises a server such as a blade server, necessary power may be supplied via a standard AC outlet, power strip, surge protector, a PDU, and/or Uninterruptible Power Supply (UPS) device.

In some embodiments, the input device 706 and/or the output device 780 are communicatively coupled to the processor 710 (e.g., via wired and/or wireless connections and/or pathways) and they may generally comprise any types or configurations of input and output components and/or devices that are or become known, respectively. The input device 706 may comprise, for example, a keyboard that allows a user of the apparatus 700 to interface with the apparatus 700 (e.g., by a consumer conducting a transaction to purchase a beverage product; by an operator or service personnel setting up and/or modifying predetermined settings for a beverage dispensing system). In some embodiments, the input device 706 may comprise a sensor configured to provide information such as a unique identifier that identifies a user and/or identifies an account of a user (e.g., a consumer's stored value account) to the apparatus 700 and/or the processor 710. The output device 780 may, according to some embodiments, comprise a display screen and/or other practicable output component and/or device. The output device 780 may, for example, provide a user interface (not explicitly shown in FIG. 7) to a player (e.g., via a display screen device). According to some embodiments, the input device 706 and/or the output device 780 may comprise and/or be embodied in a single device such as a touch screen monitor.

In some embodiments, the communication device 760 may comprise any type or configuration of communication device. The communication device 760 may, for example, comprise a network interface card (NIC), a telephonic device, a cellular network device, a router, a hub, a modem, and/or a communications port or cable. In some embodiments, the communication device 760 may be coupled to provide data to a user device (not shown in FIG. 7), such as in the case that the apparatus 700 is utilized to provide a user interface to a user via a mobile device of the user. The communication device 760 may, for example, comprise a cellular telephone network transmission device that sends signals indicative of user selection interface components, user data, and/or transaction data and/or related displays to a customer's handheld, mobile, and/or telephone device. According to some embodiments, the communication device 760 may also or alternatively be coupled to the processor 710. In some embodiments, the communication device 760 may comprise an IR, RF, Bluetooth™, and/or Wi-Fi® network device coupled to facilitate communications between the processor 710 and another device (such as a player device and/or a third-party device).

The memory device 708 may comprise any appropriate information storage device, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 708 may, according to some embodiments, store one or more of beverage dispensing instructions 712-1, user interface instructions 712-2, and/or payment processing instructions 712-3. In some embodiments, the beverage dispensing instructions 712-1, user interface instructions 712-2, and/or payment processing instructions 712-3 may be utilized by the processor 710 to provide output information via the output device 780 and/or the communication device 760, and/or to develop and store information in user account data 792, beverage data 794, and/or transaction data 796.

According to some embodiments, the beverage dispensing instructions 712-1 may be operable to cause the processor 710 to process user account data 792, beverage data 794, and/or transaction data 794 to access a user's account, determine an appropriate mix of beverage components for a user-selected beverage product (e.g., based on corresponding beverage component parameters stored in beverage data 794), determine available options for beverage products, and/or record information and/or access historical information related to the user's transaction(s) in transaction data 794.

In some embodiments, the user interface instructions 712-2 may be operable to cause the processor 710 to process user account data 792, beverage data 794, and/or transaction data 794. User account data 792, beverage data 794, and/or transaction data 794 received via the input device 706 and/or the communication device 760 may, for example, be processed by the processor 710 in accordance with the user interface instructions 712-2 to determine appropriate content to display to the user.

In some embodiments, the payment processing instructions 712-3 may be operable to cause the processor 710 to process user account data 792 (e.g., for account balance info), beverage data 794 (e.g., for corresponding beverage pricing info), and/or transaction data 794 (e.g., for recording a completed or pending payment). User account data 792, beverage data 794, and/or transaction data 794 received via the input device 706 (e.g., and/or via a payment processing device) and/or the communication device 760 may, for example, be processed by the processor 710 in accordance with the payment processing instructions 712-3 to facilitate payment processing for a desired consumer transaction.

Any or all of the exemplary instructions and data types described herein and other practicable types of data may be stored in any number, type, and/or configuration of memory devices that is or becomes known. The memory device 708 may, for example, comprise one or more data tables or files, databases, table spaces, registers, and/or other storage structures. In some embodiments, multiple databases and/or storage structures (and/or multiple memory devices 740) may be utilized to store information associated with the apparatus 700. According to some embodiments, the memory device 708 may be incorporated into and/or otherwise coupled to the apparatus 700 (e.g., as shown) or may simply be accessible to the apparatus 700 (e.g., externally located and/or situated).

Figure 8:
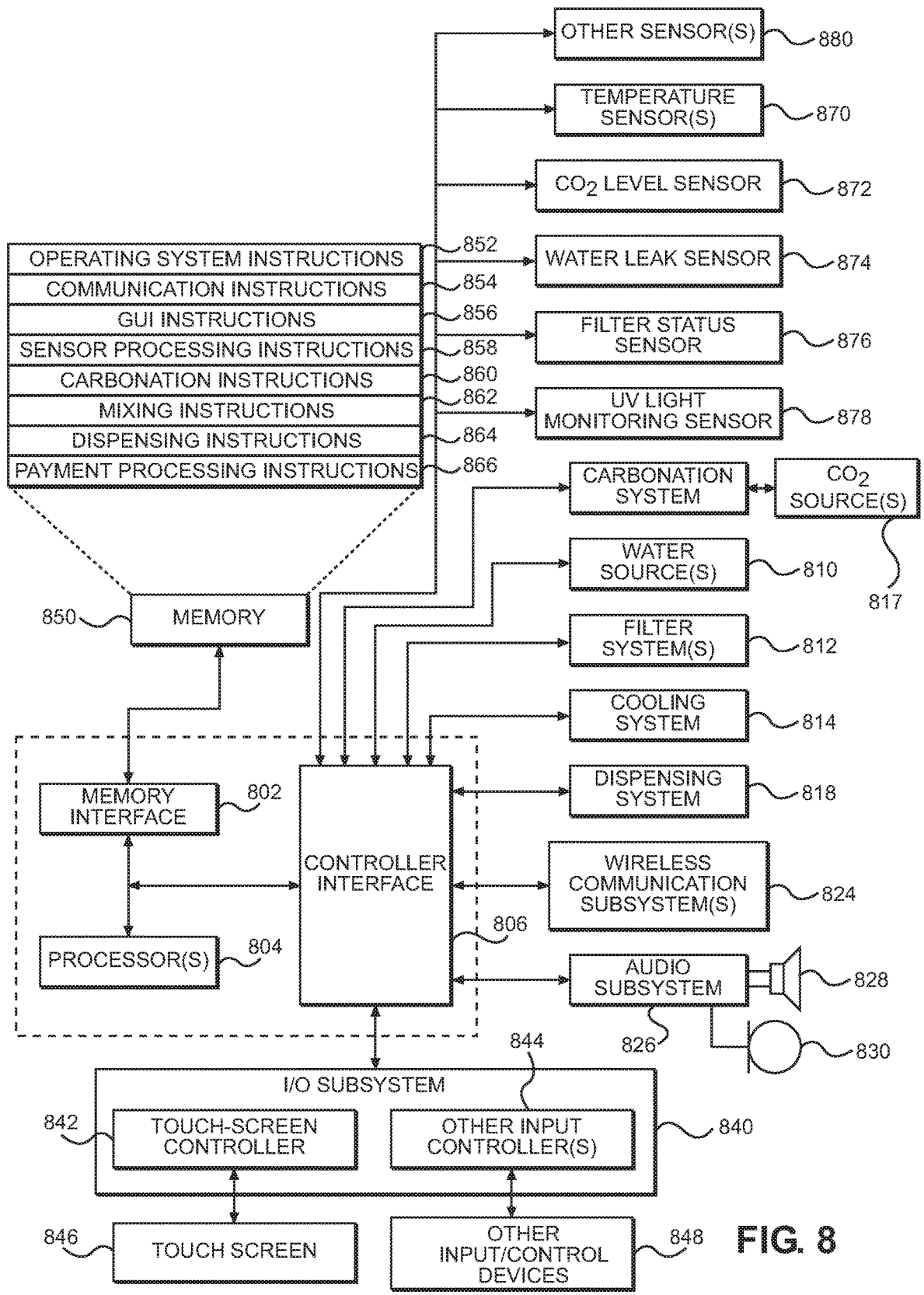
FIG. 8 is a diagram of a system according to an embodiment of the present invention.

Referring now to FIG. 8, an example system 800 is depicted, in accordance with one or more embodiments described in this disclosure.

FIG. 8 is a block diagram of an example system 800 for dispensing beverages (e.g., providing options for both carbonated and non-carbonated beverages, and producing the desired beverage product "on demand" upon its selection by a user). The system 800 may include a memory interface 802, one or more data processors, image processors and/or central processing units 804, and a controller interface 806. The memory interface 802, the one or more processors 804 and/or the controller interface 806 can be separate components or can be integrated in one or more integrated circuits. The various components in the system 800 can be coupled by one or more communication buses or signal lines.

Sensors, devices, and subsystems can be coupled to the controller interface 806 to facilitate multiple functionalities. For example, a water source(s) 810, a filter system(s) 812, a cooling system 814, a carbonation system 817 (including carbon dioxide source(s)), and/or a dispensing system 818 can be coupled to the controller interface 806 to facilitate various corresponding types of beverage mixing and/or dispensing functions, as described in this disclosure. In another example, a temperature sensor 870, a carbon dioxide sensor 872 configured to monitor a level of carbon dioxide in at least one carbon dioxide source, a water leak sensor 874, a filter status sensor 876, and/or a UV light monitoring sensor 878 can be coupled to the controller interface 806 to facilitate the monitoring, alerting, adjusting, and recording of various settings, parameters, and/or states of the system 800, as described in this disclosure. Other sensors 880 can also be connected to the controller interface 806, such as a positioning system (e.g., GPS receiver), a biometric sensor, and/or other sensing device, to facilitate related functionalities. According to one embodiment, if the level of carbon dioxide in one or more carbon dioxide sources (e.g., in the main and/or reserve carbon dioxide sources) reaches a predetermined minimum level (e.g., 4%, 0%), the system may shut down or otherwise disable one or more functions requiring or using carbon dioxide and/or make such functions unavailable to users. For example, in response to receiving a signal that a carbon dioxide level is too low, a controller device may close off a solenoid valve to a reserve carbon dioxide tank if the tank is empty or nearly empty. In another example, sparkling water and other carbonated beverage options may no longer be available for selection by customers (e.g., carbonated beverage options will be blacked out or otherwise made unavailable on an interface screen).

Communication functions can be facilitated through one or more wireless communication subsystems 824 (and/or wired communication subsystems (not shown)), which can include radio frequency receivers and transmitters and/or optical (e.g., infrared) receivers and transmitters. The specific design and embodiment of the communication subsystem 824 can depend on the communication network(s) over which the system 800 is intended to operate. For example, a system 800 may include communication subsystems 824 designed to operate over a GSM network, a GPRS network, an EDGE network, a Wi-Fi or WiMax network, and a Bluetooth™ network. In particular, the wireless communication subsystems 824 may include hosting protocols such that the system 800 may be configured as a base station for other wireless devices and/or for other beverage dispensing machines.

An audio subsystem 826 can be coupled to a speaker 828 and a microphone 830 to facilitate voice-enabled functions, such as voice recognition, voice replication, digital recording, and telephony functions.

The I/O subsystem 840 can include a touch screen controller 842 and/or other input controller(s) 844. The touch screen controller 842 can be coupled to a touch screen 846. The touch screen 846 and touch screen controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 846.

The other input controller(s) 844 can be coupled to other input/control devices 848, such as one or more buttons, rocker switches, thumb-wheel, infrared port, USB port, scanning devices, code readers, biometric devices, a payment processing device, and/or a pointer device.

The memory interface 802 can be coupled to memory 850. The memory 850 can include high-speed random access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks. The operating system 852 may include instructions for handling basic system services and for performing hardware dependent tasks. In some embodiments, the operating system instructions 852 can be a kernel (e.g., UNIX kernel).

The memory 850 may also store communication instructions 854 to facilitate communicating with one or more additional devices, one or more computers, and/or one or more servers.

The memory 850 may include graphical user interface (GUI) instructions 856 to facilitate graphic user interface processing; sensor processing instructions 858 to facilitate sensor-related processes and functions; carbonation instructions 860 to facilitate carbonation-related processes and functions; mixing instructions 862 to facilitate beverage component mixing-related processes and functions; dispensing instructions 864 to facilitate beverage dispensing-related processes and functions; and/or payment processing instructions 866 to facilitate payment-related processes and functions.

Each of the above identified instructions and applications may correspond to a set of instructions for performing one or more functions described above. These instructions need not be implemented as separate software programs, procedures, or modules. The memory 850 can include additional instructions or fewer instructions. Furthermore, various specialized functions of the system 800, in accordance with embodiments described in this disclosure, may be implemented in hardware and/or in software, including in one or more signal processing and/or application specific integrated circuits.

B. Example Processes

According to some embodiments, processes described in this disclosure may be performed and/or implemented by and/or otherwise associated with one or more specialized and/or computerized processing devices (e.g., the devices 612 and 687 of FIG. 6 in this disclosure), specialized computers, computer terminals, computer servers, computer systems and/or networks, and/or any combinations thereof. In some embodiments, methods may be embodied in, facilitated by, and/or otherwise associated with various input mechanisms and/or interfaces.

Any processes described in this disclosure do not necessarily imply a fixed order to any depicted actions, steps, and/or procedures, and embodiments may generally be performed in any order that is practicable unless otherwise and specifically noted. Any of the inventive and specialized processes and/or methods described in this disclosure may be performed and/or facilitated by specially-developed hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described in this disclosure.

According to one example process for dispensing a user-selected beverage in accordance with one or more embodiments described in this disclosure, the process begins with a user interacting with a user selection interface (e.g., an interactive display device) of a beverage dispensing machine. For purposes of illustration only, reference may be made to FIG. 6 in describing the example process. According to some embodiments, the user selection interface (e.g., user interface 601) may comprise a 22×13-inch multi-touch display comprising an all-glass surface and a robust metal chassis display. In some embodiments, a user interface 601 may be characterized by capacitive touch technology, superior durability, and ultrafast touch contact time, advantageously allowing for an optimal touch experience with every use.

To begin the vending process, a user must first purchase and fill a payment card by selecting "New Customer" on the user interface 601. The payment processing system 608 will light up to signal a "ready" state and will allow the user to insert his payment into the payment processing system 608. When accepted, a window on the user interface 601 will appear, prompting the user to insert additional bills if he wishes to load the card during purchase. If the user chooses not to load the card, he has the ability to return to a machine at a later point to load money onto the card. If he chooses to load the card during purchase, he will be prompted to insert additional bills into the payment processing system 608, up to his desired balance level. After loading the card, the screen will display the current balance and account number, and the card will be printed from the machine through a printer 610. The card printout, similar to a receipt, preferably includes the available balance, an account number, a bar code, and QR code. Once retrieved, the card is immediately ready for use.

According to some embodiments, in order to make a transaction, the user will need to scan a QR code (or other user account identifier and/or indication of an account balance) on his card by waving it underneath the bar code reader 616. After the user scans the QR code underneath the reader 616, he will have the ability to select his desired water type. To purchase water, customers will need to select the appropriate option on the user interface 104. Users will have the option to choose from a plurality (e.g., 4) of different types of filtered water—ambient, chilled, low carbonation, or high carbonation. The options may be listed on the user interface 104 as separate buttons for the user to select (e.g., as depicted in example user interface screen 602b). When an option has been chosen, the user interface 104 preferably sends a message to the server 612 (e.g., via a USB cable and/or a USB-based communications hub), signaling the desired water type. Upon delivery of this message to the server 612, the message is then sent (e.g., through a USB isolator 646) to the relay board 687 (also referred to in this disclosure as a controller device or a beverage dispensing controller device).

The controller device 687, in one embodiment, may comprise 8 relays, 3 analog outputs, and 5 opto-isolated inputs which allows the machine to process multiple signals and switch relays at a fast pace. The controller device 687 may comprise, for example, a KTA-223 Arduino™ Compatible USB Relay Controller, by Ocean Controls. It will be readily understood that different configurations and/or numbers of relays, outputs, and/or inputs may be utilized in the controller device 687. When the relay board 687 receives the message, it synthesizes it and determines which water sources should be utilized and at what rate. Next, additional messages are relayed to the appropriate sources to prepare for the dispensing process.

In some embodiments, a local, public water source may be utilized to create the filtered ambient, cold, and/or carbonated water. The local water source (e.g., water source 660) may be obtained through stainless steel tubing, for example, connected to the machine via an inlet located in a back panel (or in any desirable location). The water begins circulating once the user selects his desired water type (e.g., via the user selection interface) and the messages from the relay board 687 indicating the desired water type have been received. The tap water enters the machine through the pipes connected to the back of the machine, for example, and prepares for filtration.

According to this example process, upon entering the machine (e.g., through polyethylene tubes), the water passes through a multi-level filtration system. The filtration system, in one embodiment, preferably utilizes at least two filters and a UV-based sterilization system. The filtration system is designed to remove undesirable particles and bacteria that are often found in public water sources. This filtration process performs the necessary chemical and physical analysis of water, as may be required by law, thereby ensuring that the water is compliant with the standards in place for drinking water dispensed from beverage dispensing machines.

The water's first encounter with the system begins with a pre-filter 662. Following the pre-filtration process, the water flows through a second filter 666 and a sterilizing UV light system 668, which are included to ensure an even higher quality filtered water. Light emissions for the UV light system 668 may be monitored by a sensor connected to the relay board 687 and operated by the server 612 and/or the relay board 687.

In some embodiments, the UV emission monitor is configured to detect changes in the level of UV light emission. When the UV light intensity declines to a predetermined threshold (e.g., 70% remaining life threshold for the UV lamp), the UV emission monitor sends a signal to the server 612 (e.g., via the relay board 687) and/or to a technician (directly or indirectly). The signal may be configured, for example, to alert a technician that the UV lamp is approaching a predetermined remaining life threshold, and therefore needs to be replaced. In one or more embodiments, the signal sent preferably includes an indication of a number of days remaining in the useful life of the UV light, which is calculated (e.g., by the server 612 and/or the UV emission monitor) based upon machine use. According to one embodiment, if the UV emission level drops below 60%, all operations of the machine may be shut down by the server 612, and an alert may be sent to one or more technicians indicating the shut down and/or the UV emission level.

From here, the water either flows directly through the system to be dispensed as ambient (and still) water, or through a cooling device to be dispensed as chilled water, or through both a cooling and carbonation device to be dispensed as carbonated water.

In accordance with some embodiments, the asset machine is a machine that allows for cooling and carbonation processes to be carried out in one compact location, commonly-housed, and/or integrated component. The asset machine serves as both (1) a cooling system, which operates using an ice bank, refrigerant gas, and an ice bank agitator, and (2) a carbonation system, which uses stored carbon dioxide sources and an electronic water level sensor.

If the user opts via the user selection interface for chilled water, or carbonated water, the filtered water must go through a cooling process. To enable this, the relay board 687 would send a message to the cooling system of the asset machine, telling it to prepare for cooling. When this message is received, the cooling device will open up to allow the filtered water to enter the ice bank. The water enters the ice bank via stainless steel tubing, for example, and is transported to a pump (e.g., water pump 678) which increases the water pressure in the carbonizes. A combination of processes involving the refrigerant gas and the ice bank agitator cools the water to a pre-determined cool water temperature (e.g., as monitored by the relay board 687 and/or asset machine using a temperature sensor). After reaching the appropriate level, the water will continue to the next step to be dispensed.

If, on the other hand, the user selects either of the carbonated water options (e.g., light carbonation or full carbonation), the water will enter a carbonation phase following the cooling phase, before it is dispensed. To enable the carbonation process, the controlling device 687 will send another signal to the asset machine signaling for the carbonation device to prepare for carbonation. When this message is received, the water will move into the carbonation device and carbon dioxide gas will be released into a tube connected to the carbonation device. Upon meeting, the carbon dioxide and the chilled water will interact, creating carbonated water. The exact levels of chilled water and carbon dioxide needed to make an appropriate concentration of carbonated water is pre-determined and automatically adjusts based on chosen carbonation type (e.g., light or full). If lightly carbonated water is selected, less carbon dioxide will be released into the carbonation device, while higher levels are released for more highly or full carbonated water. Upon completion of this step, the carbonated water will be ready to be dispensed.

As discussed with respect to various embodiments in this disclosure, the "darlin" or beverage mixing module is a single dispensing device that contains numerous valves for the selective transmission of multiple (potentially different) liquids. Each valve is preferably connected to a different tube which transports a specific type of water (e.g., ambient still, chilled still, or carbonated). This particular device manages the type, flow, and volume of the water that is being dispensed by opening and closing the valves (e.g., in accordance with instructions from the relay board 687) in such a way that only specific levels of ambient, cold, or carbonated water can be allowed out of a given tube.

In some embodiments, the exact water levels may be controlled by the user who determines how much water he wants to consume by pressing for example a STOP button interface object (e.g., like the one depicted at 602*d* of FIG. 6) on the user interface 104 or user interface 601, once he's obtained his desired amount of water. Alternatively, or in addition, one or more controller devices may automatically terminate the dispensing of a beverage (e.g., at a predetermined threshold amount dispensed). When the STOP button is pressed, a signal will be fed to the relay board 687 and through to the beverage dispensing device 651, which will shut off any opened valves so that no more water is able to exit. The total dispensed volume (e.g., in liters), remaining volume, and payment card balance, may be shown on the user interface 104 and/or user interface 601. In some embodiments, a new receipt may be printed from the printer 610 and displaying the balance available for future use.

Water flows, which are pre-determined for each water type, and programmed into the system, are monitored by flow meters located at the input and output of the beverage dispensing device. These flow meters preferably have the ability to signal for adjustments in water flow based on water type and/or temperature. For example, ambient water may immediately enter the dispensing phase after being filtered, while carbonated and chilled water enter this stage only after being chilled and carbonated.

According to some embodiments, an example ambient, cold, and carbonated water dispensing apparatus consists of a plurality of different sensors (e.g., 85 total) which may be controlled and monitored, for example, remotely via an online management system. The system, for example, may use a USB controller device with the ability to interface PC's to real world applications thereby enabling disruptions to be detected and managed continuously. The management process via the sensory mechanisms has the ability to control both mechanical and non-mechanical processes and information. The following describes the extent of this control:

a) Temperature Monitoring: The temperature of the cooling system must be maintained at a specific range in order to be compliant with local laws for drinking water obtained from beverage dispensing machines. The sensors are able to identify and notify when the cooling temperature is too high or too low, and the temperature is adjusted accordingly.

b) Carbon Dioxide Monitoring: Sensors allow for monitoring of carbon dioxide levels in units in the carbon dioxide reserves. Sensors detect when carbon dioxide levels become low in one unit and can signal for the low unit to be switched to a new unit, or even for the reserve to be replenished when storage is running low.

c) Leak Detecting: a water leak sensor can detect a water leak and can send an alert for it to be fixed.

d) Filter Monitoring: Sensors monitor the use of the filters based on consumption levels, and detects when the filter cartridges need to be changed.

e) Malfunction Detecting: Sensors can signal if there is a malfunction in many of the machine's parts and processes including the asset machine, internet connection, or condensate pump.

f) UV Light Monitoring: When the UV lamp of UV sterilization system 668 reaches a predetermined threshold (e.g., 70% capacity) for light emissions, a sensor will send a signal to the server warning that a technician must be sent to replace the light.

g) Revenue Tracking: The system keeps track of and transmits the amount of money received at a particular vending machine and is able to monitor multiple vending machines at a time.

h) Account/Transaction Monitoring: The system monitors all opened accounts, as well as account usage. It is able to store information on dates and times of purchases, amounts spent, locations, and available balances.

i) Door Panel Monitoring: Signals if the door panel is open.

j) Off/on Switch: If a machine is broken or no longer able to be in use, the controller can shut the machine down and turn it back on when it is ready for use again.

When any of these malfunctions occur, the computer (e.g., server 612 and/or relay board 687) sends a coded signal to a remote server, informing it of what has occurred and what needs to be done. This alert may be automatically managed by the online server, which will alert a technician that he is needed for an on-site intervention. In one repair scenario, the solenoid valves may automatically close and the computer displays a warning page on the user interface 104, notifying the user of temporary maintenance of the system. Many of these adjustments can be made while the machine is still running or in use, and most are continuous. This allows for a low cost maintenance system.

It will be readily understood that carbon dioxide is a natural disinfectant that can be used to clean a variety of surfaces. In one embodiment, a beverage dispensing system uses carbon dioxide to disinfect a particular area (e.g., a dispensing area) by periodically letting off a carbon dioxide mist. The timing of cleaning may be scheduled or periodic and/or may be determined based on water volume related to machine use, and may be effected by an automatic signal from the server 612. The server 612 preferably directs a message to the relay board 687, which in response enables the carbon dioxide to be released and delivered to the desired location (e.g., through the darlin and out the dispenser).

Some additional features, in accordance with some alternative embodiments, are discussed in the following paragraphs. In one embodiment, a beverage dispensing system integrates two specific auto-cleaning features and four auto-shutoff safety features.

1. Auto-Cleaning:

Vending Stage Cleaning—The full vending stage may be rinsed clean at any time by remote operation, or on a pre-programmed cycle, by directing water to flow through two spray nozzles integrated into the top panel of the stage. This auto-clean feature also functions as a water line and UV reaction chamber flushing system. This system ensures that water neither heats up nor remains stagnant within the water line.

Dispenser CO2 Cleaning—In order to keep the dispensing nozzle dry and free of debris, the complete dispensing line may be sprayed with a jet of CO2 by remotely operating the integrated CO2 solenoid at the top of the dispenser. This valve may also be pre-programmed to operate on a cycle. The jet of CO2 forces out any water droplets that may remain within the system, ensuring that the dispensing nozzle remains dry.

2. Auto-Shutoff:

Solenoid Valve Auto Shutoff—In the event of an electrical malfunction, should the electrical supply to the machine cease for any reason, the initial solenoid valve will automatically return to its normally closed position, and water will not be able to flow through the system.

Dispenser Solenoid Auto-Shutoff—In the event of an electrical malfunction, should both the electrical supply to the machine cease for any reason, while the initial solenoid valve malfunctions and remains in the open position simultaneously, all solenoid valves connected to the dispensing mechanism (E_23) will remain in their normally closed position. Water will be unable to flow out of the system.

Main System Leak Detection—In the event that any component within the Water Line malfunctions and begins to leak, water will collect at the base of the machine. If that water reaches a height of ¼" the integrated water leak detector will be enabled. This detector will send a signal through the main relay board, which will automatically stop the signal to the relay corresponding to the initial solenoid valve. When that relay is opened, the initial solenoid valve will no longer receive an electrical charge, and will therefore return to its normally closed position. Water will not be able to flow through the system. Accordingly, a message preferably should appear on the screen that alerts the customer of the machine's inoperability. Further, a message will be sent to the main computer system alerting the service provider and/or manufacturer of the specific malfunction.

Condensate Pump Malfunction—In the event that the condensate pump malfunctions, water will not be pumped out of the system. Water will slowly overflow out of the pump and into the base of the machine. When this water reaches a predetermined height (e.g., ¼ inch) it will initiate the same series of events as described in the Auto-Shutoff feature above by enabling the water leak detector.

Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention may be practiced with various modifications and alterations, such as structural, logical, software, and/or electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features that must be present in all embodiments.

Neither the Title (set forth at the beginning of the first page of this disclosure) nor the Abstract (set forth at the end of this disclosure) is to be taken as limiting in any way the scope of the disclosed invention(s).

Throughout the description and unless otherwise specified, the following terms may include and/or encompass the example meanings provided below. These terms and illustrative example meanings are provided to clarify the language selected to describe embodiments both in the specification and in the appended claims, and accordingly, are not intended to be limiting.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on."

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term "process" or a like term. Accordingly, any reference in a claim to a "step" or "steps" of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

As used in this disclosure, a "user" may generally refer to any individual and/or entity that operates a device, system, and/or apparatus as described in this disclosure. Users may comprise, for example, customers, consumers, operators, service and/or repair personnel, etc.

Some embodiments may be associated with a "user device" or a "network device." As used in this disclosure, the terms "user device" and "network device" may be used interchangeably and may generally refer to any device that can communicate via a network. Examples of user or network devices include a personal computer (PC), a workstation, a server, a printer, a scanner, a facsimile machine, a copier, a personal digital assistant (PDA), a storage device (e.g., a disk drive), a hub, a router, a switch, and a modem, a video game console, or a wireless phone. User and network devices may comprise one or more communication or network components.

Some embodiments may be associated with a "network" or a "communication network." As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. In some embodiments, networks may be hard-wired, wireless, virtual, neural, and/or any other configuration or type of network that is or becomes known. Networks may comprise any number of computers and/or other types of devices in communication with one another, directly or indirectly, via a wired or wireless medium such as the Internet, LAN, WAN or Ethernet (or IEEE 802.3), Token Ring, RF, cable TV, satellite links, or via any appropriate communications means or combination of communications means. In some embodiments, a network may include one or more wired and/or wireless networks operated in accordance with any communication standard or protocol that is or becomes known or practicable. Exemplary protocols for network communications include but are not limited to: the Fast Ethernet LAN transmission standard 802.3-2002® published by the Institute of Electrical and Electronics Engineers (IEEE), Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Communication between and/or among devices may be encrypted to ensure privacy and/or prevent fraud in any one or more of a variety of ways well known in the art.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

As used in this disclosure, the term "network component" may refer to a network device, or a component, piece, portion, or combination of a network device. Examples of network components may include a Static Random Access Memory (SRAM) device or module, a network processor, and a network communication path, connection, port, or cable.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication." The term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

"Determining" something may be performed in a variety of manners and therefore the term "determining" (and like terms) includes calculating, computing, deriving, looking up (e.g., in a table, database or data structure), ascertaining, recognizing, and the like.

A "processor" means any one or more microprocessors, Central Processing Unit (CPU) devices, computing devices, microcontrollers, digital signal processors, or like devices. Examples of processors include, without limitation, INTEL's PENTIUM, AMD's ATHLON, or APPLE's A6 processor.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate). Where more than one device or article is described in this disclosure (whether or not they cooperate), a single device or article may alternatively be used in place of the more than one device or article that is described. For example, a plurality of computer-based devices may be substituted with a single computer-based device. Accordingly, functionality that is described as being possessed by more than one device or article may alternatively be possessed by a single device or article. The functionality and/or the features of a single device that is described may be alternatively embodied by one or more other devices that are described but are not explicitly described as having such functionality and/or features. Thus, other embodiments need not include the described device itself, but rather can include the one or more other devices that would, in those other embodiments, have such functionality/features.

A description of an embodiment with several components or features does not imply that any particular one of such components and/or features is required. On the contrary, a variety of optional components are described to illustrate the wide variety of possible embodiments of the present invention(s). Unless otherwise specified explicitly, no component and/or feature is essential or required.

Further, although process steps, algorithms or the like may be described or depicted in a sequential order, such processes may be configured to work in one or more different orders. In other words, any sequence or order of steps that may be explicitly described or depicted does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications, does not imply that the illustrated process or any of its steps is necessary to the invention, and does not imply that the illustrated process is preferred.

It will be readily apparent that the various methods and algorithms described in this disclosure may be implemented by specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer-readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

Accordingly, a description of a process likewise describes at least one apparatus for performing the process, and likewise describes at least one computer-readable medium and/or computer-readable memory for performing the process. The apparatus that performs a described process may include components and/or devices (e.g., a processor, input and output devices) appropriate to perform the process. A computer-readable medium may store program elements and/or instructions appropriate to perform a described method.

The term "computer-readable medium" refers to any medium that participates in providing data (e.g., instructions or other information) that may be read by a computer, a processor, or a like device. Various forms of computer-readable media may be involved in carrying data, including sequences of instructions, to a processor. For example, sequences of instruction (i) may be delivered from RAM to a processor, (ii) may be carried over a wireless transmission medium, and/or (iii) may be formatted according to any one or more of various known formats, standards, or protocols (some examples of which are described in this disclosure with respect to communication networks).

Computer-readable media may take many forms, including but not limited to, non-volatile media, volatile media, and transmission media. Non-volatile media may include, for example, optical or magnetic disks and other types of persistent memory. Volatile media may include, for example, DRAM, which typically constitutes the main memory for a computing device. Transmission media may include, for example, coaxial cables, copper wire, and fiber optics, including the wires that comprise a system bus coupled to the processor. Transmission media may include or convey acoustic waves, light waves, and electromagnetic emissions, such as those generated during RF and IR data communications. Common forms of computer-readable media include, for example, a floppy disk, a flexible disk, a hard disk, magnetic tape, any other magnetic medium, a CD-ROM, DVD, any other optical medium, a punch card, paper tape, any other physical medium with patterns of holes, a RAM, a PROM, an EPROM, a FLASH-EEPROM, a Universal Serial Bus (USB) memory stick or thumb drive, a dongle, any other memory chip or cartridge, a carrier wave, or any other medium from which a computer can read.

The term "computer-readable memory" may generally refer to a subset and/or class of non-transitory computer-readable medium that does not include intangible or transitory signals, waves, waveforms, carrier waves, electromagnetic emissions, or the like. Computer-readable memory may typically include physical, non-transitory media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, USB devices, any other memory chip or cartridge, and the like.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries may be different from those described in this disclosure. Further, despite any depiction of the databases as tables, other formats (including relational databases, object-based models, hierarchical electronic file structures, and/or distributed databases) could be used to store and/or manipulate the described data. Likewise, object methods or behaviors of a database may be used to implement one or more of various processes, such as those described in this disclosure. In addition, the databases may, in a known manner, be stored locally and/or remotely from a device that accesses data in such a database. Furthermore, while unified databases may be contemplated, it is also possible that the databases may be distributed and/or duplicated amongst a variety of devices.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant reserves the right to file additional applications to pursue patents for subject matter that has been disclosed and enabled but not claimed in the present application.

What is claimed is:

1. A beverage dispensing system, comprising:
    a first controller device;
    a user selection interface in communication with the first controller device and configured to receive a user selection of a beverage to dispense;
    a second controller device in communication with the first controller device and configured to control preparation and dispensing of a beverage based on the user selection;
    a water filtration system in communication with the second controller device and in fluid communication with a water supply source;
    a water cooling system in communication with the second controller device and configured to cool water from the water filtration system when instructed by the second controller device;
    a water carbonation system in communication with the second controller device and configured to carbonate cooled water from the water cooling system when instructed by the second controller device, the water carbonation system comprising:
        a first carbon dioxide source, and
        a chamber for combining and storing the carbonated and cooled water; and
    a beverage dispensing device, in communication with the second controller device, the beverage dispensing device being in fluid communication with a second carbon dioxide source and configured to, in response to receiving the user selection:
        receive previously carbonated and cooled water from the chamber of the water carbonation system,
        receive carbon dioxide from the second carbon dioxide source,
        mix the previously carbonated and cooled water with the received carbon dioxide from the second carbon dioxide source to prepare a beverage in accordance with the user selection, and
        dispense the beverage.

2. The beverage dispensing system of claim 1, further comprising:
    a bar code reader in communication with the first controller device and configured to receive a bar code that identifies a user account.

3. The beverage dispensing system of claim 1, further comprising:
    a payment processing device in communication with the first controller device and configured to receive payment for a beverage.

4. The beverage dispensing system of claim 1, further comprising:
a communications device in communication with the controller device and with at least one server external to the beverage dispensing system.

5. The beverage dispensing system of claim 1, further comprising:
a dispenser cleaning system, in communication with the controller device, the dispenser cleaning system comprising a carbon dioxide source and configured to use carbon dioxide to clean a dispensing area of the beverage dispensing system.

6. The beverage dispensing system of claim 1, wherein the user selection interface comprises a touch screen display.

7. The beverage dispensing system of claim 1, wherein the user selection interface is configured to receive a selection by a user of a type of beverage to dispense.

8. The beverage dispensing system of claim 1, wherein the user selection interface is configured to display a plurality of selectable beverage options.

9. The beverage dispensing system of claim 1, wherein the user selection interface is configured to receive a selection by a user of one of the following:
a carbonated water beverage, and
a non-carbonated beverage.

10. The beverage dispensing system of claim 1, wherein the user selection interface is configured to receive a selection by a user from one of the following beverage options:
ambient filtered water,
chilled filtered water,
low carbonation filtered water, and
high carbonation filtered water.

11. The beverage dispensing system of claim 1, wherein the user selection interface is configured to receive an instruction from a user to stop dispensing a beverage.

12. The beverage dispensing system of claim 1, wherein the first controller device is configured to transmit an indication of the user selection of the beverage to dispense to the second controller device.

13. The beverage dispensing system of claim 1, wherein the second controller device is configured to determine, based on the user selection, whether to instruct the water cooling system to cool water from the water filtration system.

14. The beverage dispensing system of claim 1, wherein the second controller device is configured to determine, based on the user selection, whether to instruct the water carbonation system to carbonate water for preparing the beverage.

15. The beverage dispensing system of claim 1, further comprising:
a reservoir storing water previously filtered by the water filtration system first and previously cooled by the water cooling system; and
wherein the second controller device is configured to direct the stored, filtered and cooled water, in accordance with the user selection, to either:
the beverage dispensing system, or
to the water carbonation system, and then to the beverage dispensing system.

16. The beverage dispensing system of claim 1, wherein the second controller device is configured to determine, based on the user selection, an amount of carbonation required to be applied by the beverage dispensing device to prepare the beverage.

17. The beverage dispensing system of claim 1, wherein the second controller device is configured to receive an indication of the user selection of the beverage to dispense and, in accordance with the user selection, instruct the water filtration system to begin filtering water from the water supply source.

18. The beverage dispensing system of claim 1, wherein the water filtration system comprises a first filter, a second filter, and a sterilizing ultraviolet (UV) light system.

19. The beverage dispensing system of claim 1, wherein the water filtration system comprises a sensor configured to monitor light emissions of a sterilizing ultraviolet (UV) light system.

20. The beverage dispensing system of claim 1, wherein the second controller device is configured to direct water filtered by the water filtration system directly to the beverage dispensing system, in accordance with the user selection.

21. The beverage dispensing system of claim 1, wherein the second controller device is configured to direct water filtered by the water filtration system first to the water cooling system and then to the beverage dispensing system, in accordance with the user selection.

22. The beverage dispensing system of claim 1, wherein the second controller device is configured to direct water filtered by the water filtration system first to the water carbonation system and then to the beverage dispensing system, in accordance with the user selection.

23. The beverage dispensing system of claim 1, wherein the second controller device is configured to direct water filtered by the water filtration system first to the water cooling system, then to the water carbonation system, and then to the beverage dispensing system, in accordance with the user selection.

24. The beverage dispensing system of claim 1, wherein the water cooling system and the water carbonation system are combined in an integrated asset machine.

25. The beverage dispensing system of claim 1, wherein the second controller device is configured to, in response to a user selection of a chilled water beverage or a carbonated water beverage, direct the water cooling system to cool water from the water supply source to a predetermined water temperature.

26. The beverage dispensing system of claim 1, wherein the second controller device is configured, in response to a user selection of a carbonated water beverage, to:
direct the water cooling system to cool water from the water supply source to a predetermined water temperature, and
direct the water carbonation system to receive, from the water cooling system, the water cooled to the predetermined water temperature and to carbonate the cooled water to a predetermined carbonation level.

27. The beverage dispensing system of claim 1, wherein the water carbonation system comprises a water sensor configured to detect when carbonated water in the carbonation system reaches a predetermined level.

28. The beverage dispensing system of claim 1, wherein the water carbonation system comprises at least one of the following:
an ice bank,
a refrigerant gas source,
a thermometer,
an ice bank agitator, and
a pump configured to increase water pressure in the water carbonation system,
an electronic water sensor.

29. The beverage dispensing system of claim 1, wherein the second controller device is configured, in accordance with beverage dispensing instructions and the user selection, to produce a carbonated beverage by:
- sending a signal to the water cooling system to cool water to a predetermined temperature, and
- sending a signal to the water carbonation system to move the cooled water into a water carbonation chamber and to release carbon dioxide gas into the water carbonation chamber to produce carbonated water.

30. The beverage dispensing system of claim 1, wherein the second controller device is configured, in accordance with beverage dispensing instructions and the user selection, to produce a carbonated beverage by:
- sending a signal to the water cooling system to cool water to a predetermined temperature,
- determining a level of carbonation based on the user selection, and
- sending a signal to the beverage dispensing device to move a predetermined amount of cooled water that corresponds to the user selection into the chamber and to release a predetermined amount of carbon dioxide gas that corresponds to the user selection into the chamber to produce carbonated water.

31. The beverage dispensing system of claim 1, wherein the beverage dispensing device comprises a plurality of selectively controllable valves, each selectively controllable valve being controllable by the second controller device to prepare the beverage in accordance with the user selection,
- wherein a first selectively controllable valve corresponding to controlling flow of the previously carbonated and cooled water from the chamber of the water carbonation system, and
- wherein a second selectively controllable valve corresponding to controlling flow of the carbon dioxide from the second carbon dioxide source.

32. The beverage dispensing system of claim 1, wherein the beverage dispensing device comprises a plurality of selectively controllable beverage component inputs integrated in a beverage mixing module, each selectively controllable beverage component input being controllable by the second controller device.

33. The beverage dispensing system of claim 1, wherein the beverage dispensing device comprises:
- a first input tube for receiving carbon dioxide gas from the second carbon dioxide source,
- a second input tube for receiving still water,
- a third input tube for receiving chilled still water,
- a fourth input tube for receiving carbonated water from the chamber, and
- a dispenser for dispensing a beverage comprising at least one of the still water, the chilled still water, and the carbonated water.

34. The beverage dispensing system of claim 1, wherein the beverage dispensing device comprises a flow meter configured to determine a rate of flow of the beverage out of the beverage dispensing device.

35. The beverage dispensing system of claim 1, wherein the beverage dispensing device comprises a flow meter configured to determine a rate of flow of the beverage out of the beverage dispensing device, and wherein the second controller device is configured to dispense the beverage at a predetermined flow rate.

36. The beverage dispensing system of claim 1, wherein the beverage dispensing device comprises a plurality of valves for controlling the dispensing of one or more beverage components, and wherein the beverage dispensing device is configured to close all open valves of the plurality of valves in response to receiving, via the user selection interface, an indication that a user wants to terminate dispensing of the beverage.

37. The beverage dispensing system of claim 1, wherein the beverage dispensing device comprises a flow meter.

38. The beverage dispensing system of claim 1, further comprising a printer configured to, in response to an instruction from the first controller device, print a receipt for a transaction.

39. The beverage dispensing system of claim 1, wherein the beverage dispensing device comprises a respective flow meter for each of a plurality of input tubes, each input tube being associated with a respective beverage component, and each flow meter being configured to measure a flow of the corresponding beverage component.

40. The beverage dispensing system of claim 1, further comprising at least one of the following types of sensors:
- a temperature sensor configured to monitor a temperature of the water cooling system,
- a first carbon dioxide sensor configured to monitor a level of carbon dioxide in the first carbon dioxide source,
- a second carbon dioxide sensor configured to monitor a level of carbon dioxide in the second carbon dioxide source,
- a water sensor configured to detect a water leak,
- a filter monitoring sensor configured to produce an alert when a filter cartridge needs to be replaced,
- a malfunction sensor configured to detect a malfunction in the operation and components of the beverage dispensing system, and
- an ultraviolet (UV) light sensor configured to monitor a level of emission of a UV light source.

41. The beverage dispensing system of claim 1, further comprising:
- a carbon dioxide sensor configured to monitor a level of carbon dioxide in the first carbon dioxide source and to transmit a signal to the second controller device in response to determining that a level of carbon dioxide in the first carbon dioxide source has reached a predetermined minimum level; and
- wherein the second controller device is configured to disable at least one function that uses carbon dioxide in response to receiving a signal from the carbon dioxide sensor indicating that a level of carbon dioxide in the first carbon dioxide source has reached the predetermined minimum level.

42. The beverage dispensing system of claim 1, further comprising at least one of a user account monitoring module for monitoring all user accounts and transaction monitoring module for storing transaction information associated with user transactions with the beverage dispensing system.

* * * * *